(12) United States Patent
Islam et al.

(10) Patent No.: US 6,888,661 B1
(45) Date of Patent: May 3, 2005

(54) SQUARE FILTER FUNCTION TUNABLE OPTICAL DEVICES

(75) Inventors: Mohammed N. Islam, Allen, TX (US); Amos Kuditcher, Allen, TX (US)

(73) Assignee: Cheetah Omni, LLC, Ann Arbor, MI (US)

( * ) Notice: Subject to any disclaimer, the term of this patent is extended or adjusted under 35 U.S.C. 154(b) by 41 days.

(21) Appl. No.: 10/170,326

(22) Filed: Jun. 13, 2002

(51) Int. Cl.[7] .............................. G02F 1/07; G02F 1/13; G02B 27/00
(52) U.S. Cl. ...................... 359/260; 359/359; 359/578; 349/198
(58) Field of Search ................................ 359/107, 108, 359/245, 247, 259, 260, 484, 578, 586–590; 349/18, 74, 86, 114, 198; 372/20

(56) References Cited

U.S. PATENT DOCUMENTS

| | | | |
|---|---|---|---|
| 4,197,008 A | 4/1980 | Pinnow et al. | 356/150 |
| 4,240,696 A | 12/1980 | Tracy et al. | 350/163 |
| 4,269,481 A | 5/1981 | Yeh et al. | 350/356 |
| 4,350,413 A | 9/1982 | Bottka et al. | 350/356 |
| 4,589,737 A | 5/1986 | Sashital | 350/356 |
| 4,779,959 A | 10/1988 | Saunders | 350/346 |
| 4,786,128 A | 11/1988 | Birnbach | 356/96.14 |
| 5,068,749 A | 11/1991 | Patel | 359/93 |
| 6,271,899 B1 | 8/2001 | Lewis et al. | 349/86 |
| 6,522,469 B1 * | 2/2003 | Fuqua et al. | 359/578 |
| 2002/0176659 A1 * | 11/2002 | Lei et al. | 385/24 |
| 2002/0191268 A1 * | 12/2002 | Seeser et al. | 359/260 |

FOREIGN PATENT DOCUMENTS

| | | | | |
|---|---|---|---|---|
| WO | 91/04506 | 4/1991 | | G02B/5/28 |
| WO | 00/05832 | 3/2000 | | H04J/14/02 |
| WO | 00/45202 | 3/2000 | | G02B/5/28 |
| WO | 01/15368 A2 | 1/2001 | | H04J/14/00 |
| WO | 01/18573 A1 | 3/2001 | | G02B/6/12 |
| WO | 01/75497 A1 | 11/2001 | | G02B/6/35 |

OTHER PUBLICATIONS

"Electro–Optic Fabry–Perot Modulators," Electro–Optic Devices, pp. 288–293, undated.
Mendes et al., "Structural and electrical properites of strontium barium niobate thin films crystallized by conventional furnace and rapid–thermal annealing process," J. Mater. Res., vol. 16, No. 10, pp. 3009–3013, Oct. 2001.
"Network Photonics Products & Technology," 1 page http://www.networkphotonics.com/products/index.html, Internet Date Jan. 29, 2002.
"1–D vs. 2–D vs. 3–D MEMS Optical Switch Architectures," Network Photonics, pp. 1–3, undated.
"CrossWave™ A Reliable MEMS–Based Optical Switch," Network Photonics, pp. 1–4, undated.
"Dynamic All Optical Add/Drop In Long Haul and Ultra–Long–Haul Networks," Network Photonics, pp 1–3, undated.
"Understanding Wavelength Cross–Connects," Network Photonics, pp. 1–3, undated.
"AgileWave™ Tunable Bandpass Filter," CiDRA—Optical network solutions, Products, http://www.cidra.com/products/monitoring_bandpass.html, Internet Date Jan. 30, 2002.

(Continued)

*Primary Examiner*—Georgia Epps
*Assistant Examiner*—William Choi
(74) *Attorney, Agent, or Firm*—Baker Botts L.L.P.

(57) ABSTRACT

A tunable optical device includes a thin film device. The thin film device includes a plurality of cavities each including an electro-optic material. The electro-optic material includes an optical characteristic capable of being manipulated by application of an electric field. In this embodiment, at least some of the plurality of cavities are coherently coupled to others of the plurality of cavities. In this embodiment, the plurality of cavities include a sufficient number of cavities to result in an approximately square frequency response for the device.

65 Claims, 9 Drawing Sheets

OTHER PUBLICATIONS

"AgileWave™ Tunable Bandpass Filter," CiDRA—Optical network solutions, Product Bulletin, TBF 37nm Data Sheet, 2 pages, Jun. 8, 2001.

Bayne, et al., "Broadcast-and-select OADM enables low-cost transparency," LIGHTWAVE, www.light.com, 4 pages, Dec. 2001.

"CORNING Discovering Beyond Imagination," slide show presentation, 13 pages, undated.

Paul H. Beckwith, "MEMS Small Optical Cross Connect, Wavelength Switch (WS) and Wavelength Blocker (WB), Component Switches," JDS Uniphase, slide show presentation, 33 pages, undated.

"4-Channel COADM with Attenuators," JDS Uniphase, slide show presentation, 10 pages, undated.

"Configurable Add/Drop Multiplexing," Application Note, JDS Uniphase, 6 pages, Rev. A Jun. 2000.

"terra-Q DWDM Optical Channel Wideband Filters, Signals Separation Filters for DWDM Mux/Dermus Applications," Cierra Photonics, brochure, 21 pages, undated.

Fludger, et al., "Pump to Signal RIN Transfer in Raman Fiber Amplifiers," Journal of Lightwave Technology, vol. 19, No. 8, 9 pages, Aug. 2001.

Espindola, et al., "Penalty-free 10 Gbit/s single-channel co-pumped distributed Raman amplification using low RIN 14xx nm DFB pump," Electronics Letters, vol. 38, No. 3, 2 pages, Jan. 31, 2002.

Küng, et al., "Demonstration of All-Raman Ultra-Wide-Band Transmission of 1.28 Tb/s (128 ×10Gb/s) over 4000 km of NZ-DSF with Large BER Margins," Bell Labs—Lucent Technologies, 2 pages, undated.

Scheerer, et al., "Influence of the dispersion map on limitations due to cross-phase modulation in WDM multispan transmission systems, " Siemens AG, 3 pages, undated.

"Multi-Channel Mux/Demux Module 200 GHz Spacing," JDS Uniphase Product Bulletin, 3 pages, Rev. 001 05/02.

"Fiberoptic Switch MEMS Series," JDS Uniphase Product Bulletin, 3 pages, Rev. 003 02/02.

"Voltage-Controlled Optical Filter VCF 200 Series," JDS Uniphase Product Bulletin, 3 pages, Rev. 001 03/02.

"Voltage-Controlled Optical Filters VCF050/100 Series," JDS Uniphase Product Bulletin, 3 pages, Rev. 001 03/02.

"Fiberoptic Swicth MOM Series, " JDS Uniphase Product Bulletin, 2 pages, Rev. 003 02/02.

"Variable Optical Attenuator Multiplexer V-MUX Series," JDS Uniphase Product Bulletin, 4 pages, Rev. 001 09/01.

"Fiberoptic Switch SN Series," JDS Uniphase Product Bulletin, 3 pages, Rev. 003 05/02.

"Switch, RA Series," JDS Uniphase, 2 pages http://www.jdsu.com/site/product/pop_printable.cfm?ProductID=1118&PageName=Print%20Product, Internet Date Jun. 13, 2002.

"Add/Drop, Configurable, Filter + Switch + VOA," JDS Uniphase Product, 1 page http://www.jdsu.com//index2cfm?NAVCID=5&CID=5&PageName=Add Drop, Configurable, Filter + Switch, Internet Date Jun. 13, 2002.

"Customized Switch Modules," JDS Uniphase Product, 2 pages, undated.

* cited by examiner

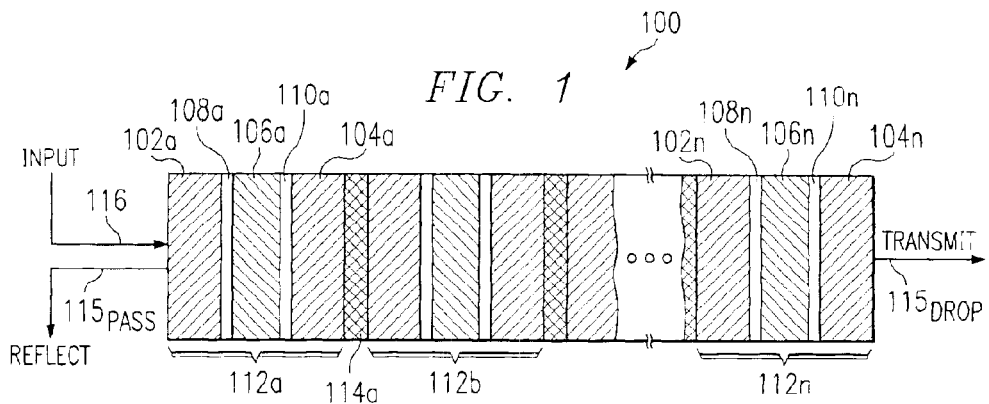
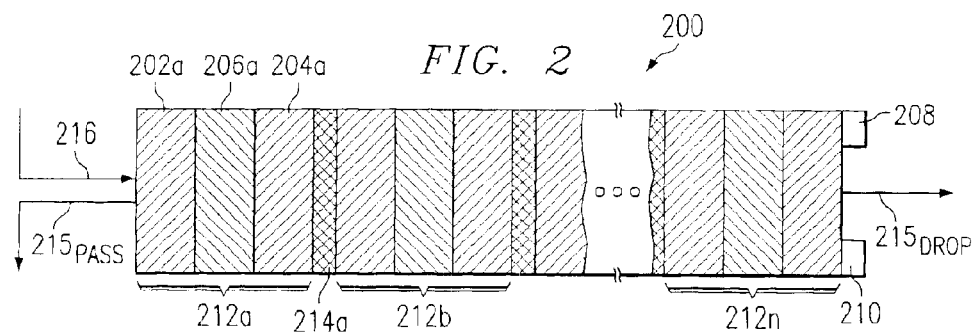
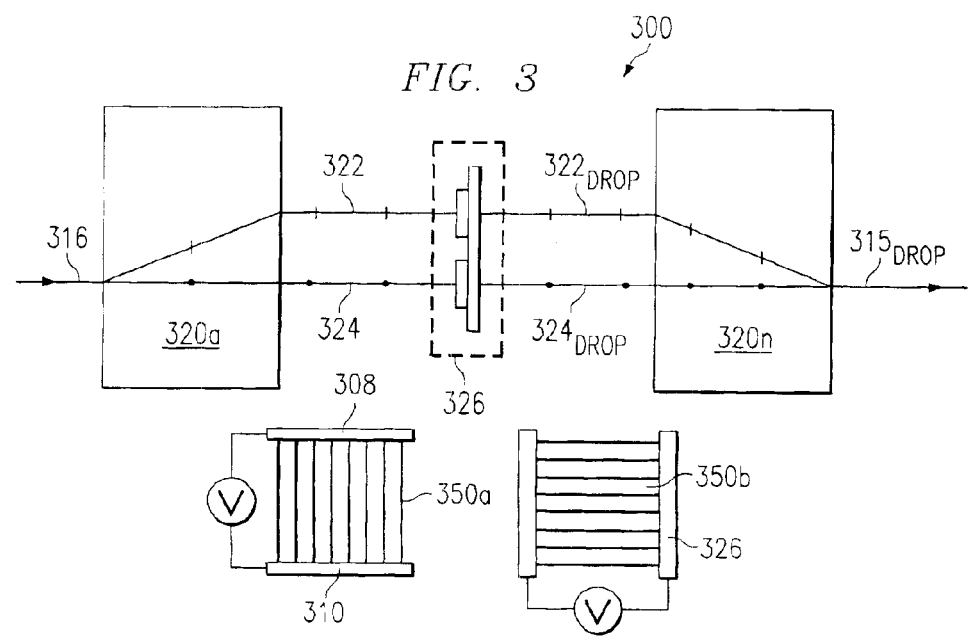

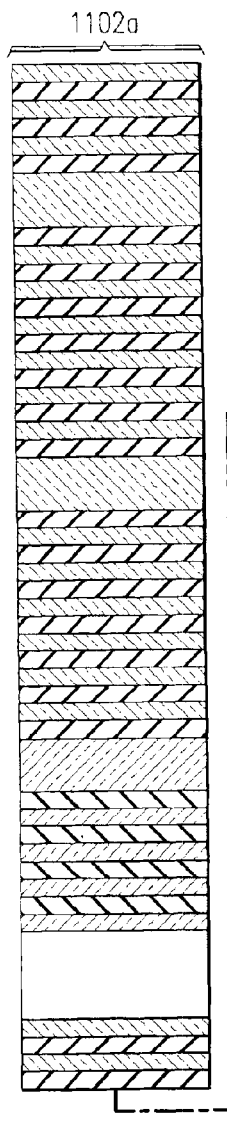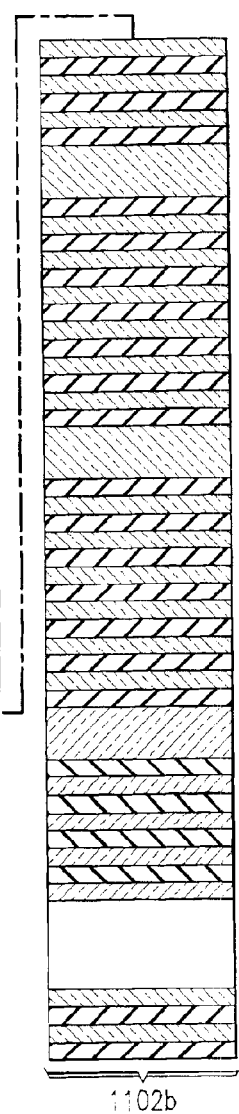
FIG. 11A
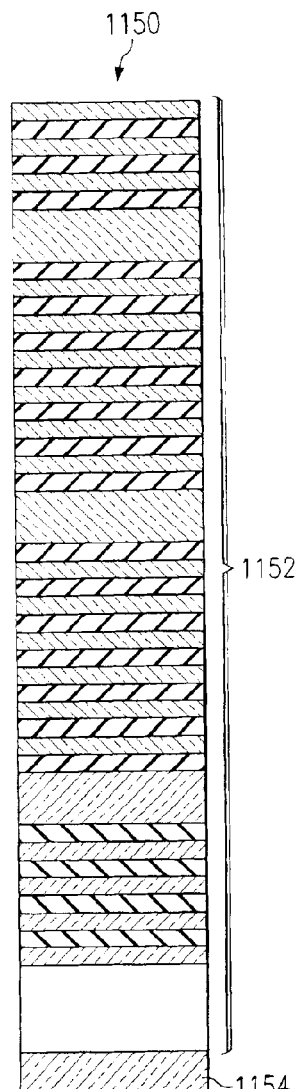
FIG. 11B

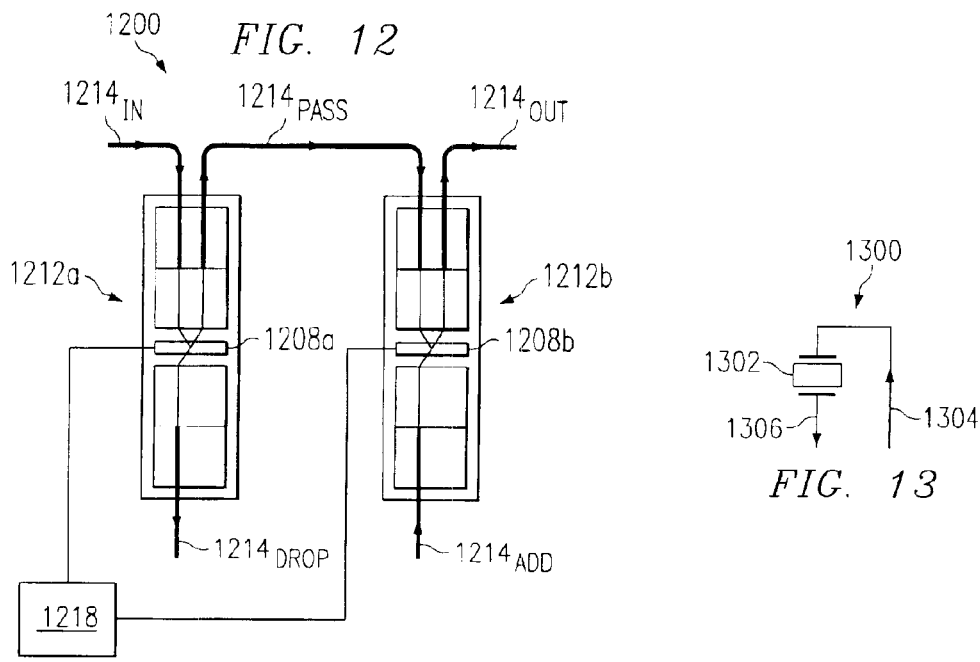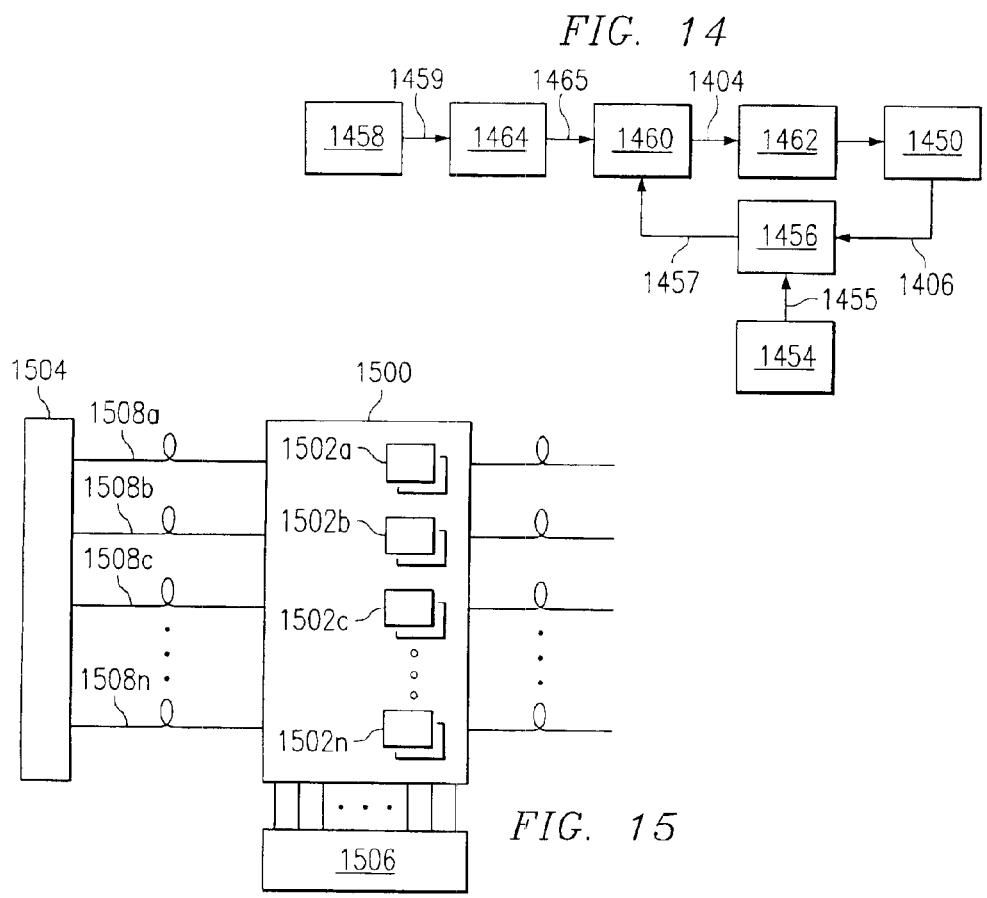

SQUARE FILTER FUNCTION TUNABLE OPTICAL DEVICES

TECHNICAL FIELD OF THE INVENTION

This invention relates in general to the field of communications systems and, more specifically, to optical processing devices and applications thereof.

OVERVIEW

Tunable optical devices communicate desired wavelengths of light by selectively changing the response of the device to the wavelength selected for communication. Fabrication of conventional tunable optical devices typically results in a device with a response that comprises a relatively slow frequency roll-off, which can lead to degradation of wavelength signals adjacent to the desired wavelength. Moreover, conventional tunable optical devices employing electro-optic materials often result in devices with severe polarization dependence.

SUMMARY OF EXAMPLE EMBODIMENTS

The present invention provides an improved apparatus and method for selectively communicating optical signals and provides several novel applications for tunable optical devices. In accordance with the present invention, an apparatus and method for communicating optical signals using electro-optic materials are provided that reduce or eliminate at least some of the shortcomings associated with prior approaches.

In one embodiment, a tunable optical device comprises a thin film device. The thin film device comprises a plurality of cavities each comprising an electro-optic material. The plurality of cavities comprise a sufficient number of cavities to result in an approximately square frequency response for the device. The electro-optic material comprises an optical characteristic capable of being manipulated by application of an electric field. In one embodiment, at least some of the plurality of cavities are coherently coupled to others of the plurality of cavities.

In another embodiment, a method of manufacturing a tunable optical device comprises forming a first reflective stack outwardly from a matching layer. The method also comprises depositing an electro-optic layer outwardly from the first reflective stack. The method further comprises crystallizing the electro-optic layer to induce a substantially crystalline like behavior in the electro-optic layer. The method also comprises forming a second reflective stack outwardly from the electro-optic layer.

In yet another embodiment, a tunable optical device comprises a thin film device. The thin film device comprises at least one cavity comprising an electro-optic material. The electro-optic material comprises an optical characteristic capable of being manipulated by application of an electric field. In this embodiment, at least a portion of a multiple wavelength optical signal incident on the thin film device is transmitted through the at least one cavity, and at least a portion of the optical signal is reflected from the thin film device. The determination of the transmitted and reflected signal portions based at least in part on the electric field applied to the electro-optic material residing in each cavity. In this embodiment, the thin film device substantially achieves polarization independence.

In still another embodiment, a tunable optical device comprises a thin film device. The thin film device comprises at least one cavity comprising an electro-optic material. The electro-optic material comprises an optical characteristic capable of being manipulated by application of an electric field. In this embodiment, at least a portion of a multiple wavelength optical signal incident on the thin film device is transmitted through the at least one cavity, and at least a portion of the optical signal is reflected from the thin film device. The determination of the transmitted and reflected signal portions based at least in part on the electric field applied to the electro-optic material residing in each cavity. In this embodiment, the thin film device substantially reduces a ripple penalty associated with the at least a portion of the multiple wavelength signal that travels through the at least one optical cavity.

In still another embodiment, a method of selectively communicating an optical signal from a tunable optical device, comprises receiving a multiple wavelength signal at a thin film device comprising a plurality of cavities each comprising an electro-optic material. The plurality of cavities comprises a sufficient number of cavities to result in an approximately square frequency response for the device. The method also comprises manipulating an optical characteristic associated with the electro-optic material by application of an electric field to the thin film device. The method further comprises selectively communicating one or more wavelengths of the multiple wavelength signal based at least in part on the applied electric field. In this embodiment, at least some of the plurality of cavities are coherently coupled to others of the plurality of cavities.

In another embodiment, an optical add/drop multiplexer (OADM) comprises a tunable optical filter operable to selectively drop at least one band of wavelengths from a multiple wavelength signal received by the tunable optical filter. The OADM further comprises a switch coupled to a drop port of the tunable optical filter and an add port of the tunable optical filter. In this embodiment, the switch operates to communicate to the add port a wavelength signal received from the drop port during tuning operations of the optical filter.

In yet another embodiment, a method of selectively adding/dropping an optical signal from an optical add/drop multiplexer comprises tuning an optical characteristic associated with a tunable filter by application of an electric field to the tunable filter. The method further comprises receiving a multiple wavelength signal comprising a plurality of bands of wavelength signals at an tunable filter. The method also comprises selectively dropping at least one band of wavelength signals from the multiple wavelength signal received by the tunable filter. The method further comprises communicating to an add port of the tunable filter a wavelength signal received from a drop port of the tunable filter during tuning operations of the tunable filter.

In still another embodiment, a surface normal modulator comprises a tunable optical filter having a filter response. The filter response is operable to substantially pass one or more wavelengths residing spectrally within a pass band of the filter and to substantially block wavelengths outside of the pass band. The surface normal modulator also comprises a controller operable to generate a control signal for communication to the tunable optical filter. The tunable optical filter is operable to modulate information onto a received optical signal by selectively changing, based at least in part on the control signal, a single-pass optical path of a cavity of the tunable optical filter resulting in a corresponding phase shift of less than $\pi/2$ for at least one wavelength. In other embodiments, the tunable optical filter comprises a contrast ratio of at least five (5) decibels. In some embodiments, the tunable optical filter and the controller are co-located on a substrate. In other embodiments, the tunable optical filter modulates digital information onto the received optical signal at a rate of 9.5 gigabits per second or more.

In a method embodiment, a method of modulating digital information onto an optical signal comprises receiving an optical signal at a tunable optical filter. The tunable optical filter comprises a filter response operable to substantially pass one or more wavelengths residing spectrally within a pass band of the filter and to substantially block wavelengths outside of the pass band. The method further comprises generating a control signal for communication to the tunable optical filter. The method also comprises modulating information onto the received optical signal by selectively shifting in frequency a pass band based at least in part on the control signal. In one particular embodiment, the tunable optical filter comprises an approximately square frequency response. In addition, the tunable optical filter comprises a contrast ratio of at least five (5) decibels.

In another method embodiment, a method of modulating digital information onto an optical signal comprises generating a plurality of substantially different wavelengths of light. The method also comprises forming an optical signal by selecting one or more specific wavelengths of light from the plurality of different wavelengths of light. The method further comprises receiving the optical signal at a tunable optical filter. The method also comprises modulating information onto the received optical signal by selectively shifting in frequency a pass band of the tunable optical filter. In one particular embodiment, the tunable optical filter comprises an approximately square frequency response. In addition, the tunable optical filter comprises a contrast ratio of at least five (5) decibels.

Depending on the specific features implemented, particular embodiments of the present invention may exhibit some, none, or all of the following technical advantages. Various embodiments enable the formation of a flat-top or square-like device function, which can reduce the signal degradation in signals adjacent to the desired wavelength signal. Some embodiments may, implement a polarization independent configuration, which may substantially prevent an electric field from influencing either of a pair of approximately orthogonally polarized beam components forming the optical signal. Other embodiments may be capable of selectively communicating a desired wavelength or range of wavelengths while minimizing a ripple penalty within the selectively communicated wavelength or range of wavelengths.

Other technical advantages will be readily apparent to one skilled in the art from the following figures, descriptions and claims. Moreover, while specific advantages have been enumerated above, various embodiments may include all, some or none of the enumerated advantages.

BRIEF DESCRIPTION OF THE DRAWINGS

For a more complete understanding of the present invention, and for further features and advantages thereof, reference is now made to the following description taken in conjunction with the accompanying drawings, in which:

FIG. 1 is a block diagram illustrating one example of a tunable multiple-cavity optical device;

FIG. 2 is a block diagram illustrating one example of a tunable multiple-cavity optical device configured in a transverse configuration;

FIG. 3 is a block diagram showing a pair of transversely configured tunable multiple-cavity optical devices implementing a polarization diversity technique;

FIGS. 11A and 11B are block diagrams illustrating exemplary embodiments of non-blocking electro-optic tunable devices;

FIG. 12 is a block diagram illustrating an exemplary embodiment of a tunable non-blocking OADM implementing a serial combination of non-blocking tunable optical devices;

FIG. 13 is a block diagram of one exemplary embodiment of an electro-optic voltage variable capacitor;

FIG. 14 is a block diagram of one exemplary embodiment of a digital feedback control system; and FIG. 15 is a block diagram illustrating an exemplary embodiment of a surface normal modulator.

DETAILED DESCRIPTION OF EXAMPLE EMBODIMENTS

1. Tunable Multiple Cavity Device

Figure 4:
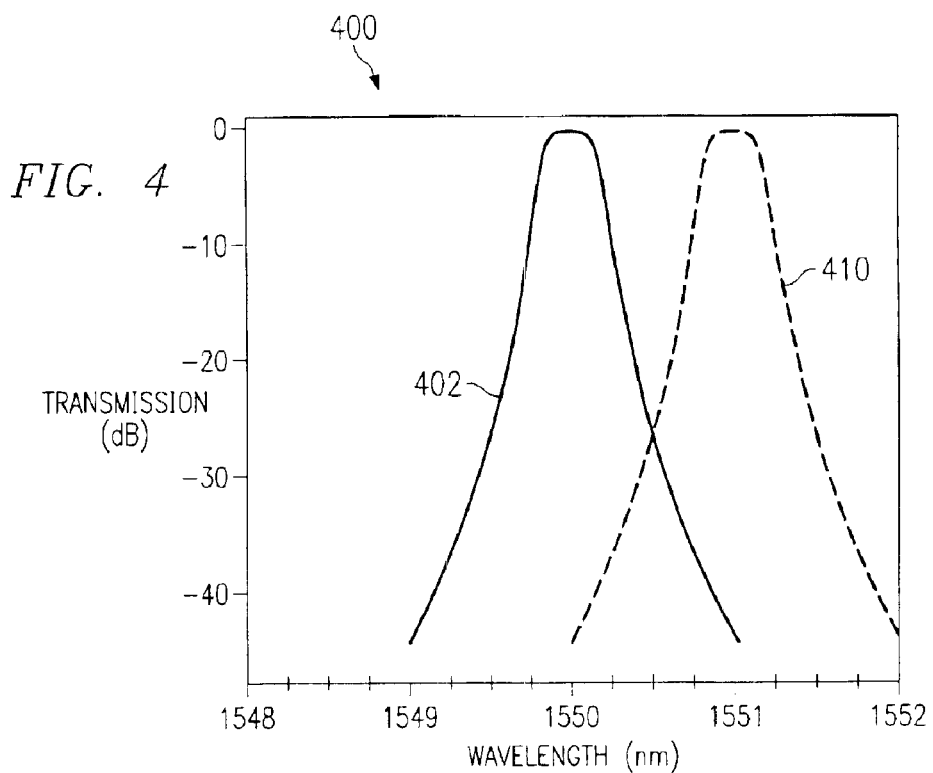
FIG. 4 is a graph showing one example of transmission spectra of a tunable multiple-cavity optical device.

FIG. 1 is a block diagram illustrating one example of a tunable multiple-cavity optical device 100. In this example, device 100 includes a plurality of adjacent fundamental stacks 112a-112n each operable to selectively communicate all or a portion of a desired wavelength or range of wavelengths of light. In this example, each fundamental stack 112 comprises a pair of reflective stacks 102 and 104. Each reflective stack 102, 104 comprises a partially transmitting dielectric mirror having alternating layers of higher index dielectric materials and lower index dielectric materials. Each pair of alternating layers of dielectric materials forms a fundamental period within each reflective stack 102, 104. The number of fundamental periods within each reflective stack depends at least in part on the desired reflectivity of device 100 and can be selected as a matter of design choice.

Each fundamental stack 112 further comprises an optical cavity 106 formed between reflective stack 102 and reflective stack 104. As used throughout this document the term "optical cavity" refers merely to the stratum between reflective stacks, which may comprise a dielectric material, another material, a gas, or a combination of a dielectric material, other materials, and/or a gas. Optical cavity 106 may comprise any dielectric material capable of selectively communicating all or a portion of a desired wavelength of light depending at least in part on an electric field applied to the material.

Multi-cavity device 100 selectively communicates all or a portion of a desired optical signal by applying an electric field to the dielectric material contained within each optical cavity 106. One aspect of this disclosure recognizes that applying an electric field to the dielectric material causes a change in one or more optical characteristics of the material, thus selectively changing the wavelength signal transmitted through device 100. Changing the polarization property of a liquid crystal material or manipulating the index of refraction of an electro-optic material are just a few examples of the optical characteristics that the electric field can charge.

In this particular embodiment, at least one of the plurality of optical cavities 106 comprises an electro-optic material with an index of refraction that is capable of being manipulated through the application of an electric field to the electro-optic material. Changing the index of refraction of the electro-optic material has the effect of modifying the effective optical cavity length. As used throughout this document, the term "effective optical cavity length" refers to the optical path length of the optical cavity. The optical path length and/or the effective optical cavity length ($L_{oc}$) can be determined by multiplying the index of refraction (n) of the electro-optic material by the thickness (t) of the electro-optic material. In equation form, this relationship is:

$$L_{oc} = n \times t$$

Modifying the effective optical cavity length has the effect of selectively changing the optical signal communicated from device 100. Lithium niobate, lithium tantalate, strontium barium niobate, and lanthanum modified lead zirconate titanate provide a few examples of suitable electro-optic materials.

In this particular embodiment, fundamental stack 112 also includes a pair of electrodes 108, 110 each coupled between optical cavity 106 and reflective stacks 102, 104, respectively. Each electrode 108, 110 is capable of at least partially inducing an electric field within device 100. Although in this example a pair of electrodes 108, 110 surround each optical cavity 106, other electrode configurations can be implemented without departing from the scope of the present disclosure. For example, where each optical cavity 106 comprises an electro-optic material with a substantially similar cavity length, a single pair of electrodes may be utilized to change the index of refraction for the plurality of optical cavities 106. In that example, electrode 108 can be coupled to reflective stack 102a, while electrode 110 can be coupled to reflective stack 104n. Each electrode 108 and 110 may comprise any at least partially transparent material such as, for example, doped polysilicon or indium tin oxide.

In the illustrated embodiment, multiple-cavity device 100 further comprises a plurality of transition layers 114, each residing between adjacent pairs of fundamental stacks 112. Each transition layer 114 operates to couple fundamental stacks 112 in a manner that produces an approximately flat-top or square-like response. The material used to form transition layer 114 can be selected to have a desired index of refraction that contrasts with the indices of refraction of other materials used to form fundamental stacks 112. The index of refraction of transition layer 114 operates to form a contrast between the last dielectric layer of reflective stack 104 and the first dielectric layer of reflective stack 102. For example, where the last dielectric layer of reflective stack 104a comprises a higher index dielectric material and the first dielectric layer of reflective stack 102b also comprises a higher index dielectric material, transition layer 114 can comprise a lower index dielectric material.

Multiple-cavity device 100 can operate in transmission or reflection mode. That is, device 100 can operate to transmit selected wavelengths while reflecting others, or can operate to reflect selected wavelengths while transmitting others. For ease of description, the following discussion assumes that device 100 operates in transmission node; transmitting a selected wavelength or range of wavelengths, while reflecting others.

The range of wavelengths selected for transmission through device 100 depends, at least in part, on the number of alternating layers of higher and lower index dielectric materials in each reflective stack 102, 104. The greater the number of alternating layers, the higher the reflectivity of fundamental stack 112, and the more narrow the band-width of the selected pass-through signal. Using a sufficient number of alternating layers in each reflective stack 102, 104 can result in selecting a single wavelength signal $115_{DROP}$ from a multiple wavelength signal 116 received by device 100.

Conversely, a wider range of wavelengths can be selected for transmission through device 100 by decreasing the number of alternating layers in each reflective stack 102, 104. Simply decreasing the number of alternating layers in each reflective stack 102, 104, while maintaining the same number of reflective stacks 102, 104, however, typically results in a slower frequency roll-off for device 100. This slower frequency roll-off can lead to degradation of wavelength signals adjacent to the selected pass-through signal or signals of device 100. Adjacent signal degradation can be reduced by increasing the number of fundamental stacks 112 (and thus increasing the number of reflective stacks 102, 104) in device 100. Increasing the number of fundamental stacks 112 makes the side-band roll-off of device 100 steeper, thus reducing degradation of wavelength signals adjacent to the pass-band, while increasing the number of wavelengths selected for transmission through device 100.

Conventional tunable multiple-cavity communication devices utilizing electro-optic materials can result in a response that comprises a Lorentzian shape, which comprises a relatively slow frequency roll-off and leads to degradation of wavelength signals adjacent to the pass-band. One aspect of this disclosure recognizes that increasing the number of fundamental stacks 112, while maintaining the same number of alternating layers in each reflective stack 102, 104 can form a substantially flat-top or "square-like" filter function as a function of frequency. As used in this document, the terms "flat-top" and "square-like" refer to a device response that is substantially flat over the selected pass-band wavelengths. The square-like response is advantageous in providing a slightly wider pass-through bandwidth. The square-like response can also provide a steeper side-band roll-off that has the effect of reducing the degradation of wavelengths adjacent to the pass-through signal or signals. In addition, further increasing the number of fundamental stacks 112 has the effect of widening the pass-through signal bandwidth, which enables device 100 to pass-through a wider range of wavelengths for transmission through device 100.

In the illustrated embodiment, device 100 is capable of creating a substantially square-like response. The square-like response operates to minimize distortion of the pass-through signals, to reduce cross-talk between adjacent channels, and to minimize the stability requirement of the light sources. In various embodiments, the square-like response can comprise a −1 decibel bandwidth of at least 12.5 giga-hertz, 20 giga-Hertz, 25 giga-Hertz or more. In other embodiments, the square-like response can comprise a −30 decibel bandwidth of at least 500 giga-Hertz, 250 giga-Hertz, 200 giga-Hertz or less.

In the illustrated embodiment, multiple-cavity device 100 operates in a longitudinal configuration. As used in this document the term "longitudinal configuration" refers to a configuration of device 100 where multiple wavelength signal 116 is propagated parallel to the direction of an electric field generated by electrodes 108, 110. In this example, each optical cavity 106 comprises an electro-optic material that has a relatively high electro-optic coefficient. A relatively high electro-optic coefficient enables the application of a relatively low voltage to electrodes 108, 110 to induce a change in the index of refraction of the material.

In one particular embodiment, longitudinally configured multiple-cavity device 100 is capable of substantially maintaining polarization independence. As used in this document, the term "polarization independence" refers to a device where the effect of the device on light polarized in one plane is substantially similar to its effect on light polarized in the orthogonal plane. In various embodiments, device 100 is capable of achieving a polarization dependent loss of two (2) decibels or less, one (1) decibel or less, or one-half (½) decibel or less. In this embodiment, the electro-optic material contained within each optical, cavity 106 comprises a crystalline structure that has a crystal symmetry where the crystal axis is substantially parallel to the direction of propagation of multiple wavelength signal 116. As used throughout this document, the term "crystal axis" refers to the optic axis of the crystalline structure comprising the longest crystal lattice.

One aspect of this disclosure recognizes that, at least in a uniaxial longitudinally configured device, applying the electric field parallel to both a crystal axis and the direction of propagation of multiple wavelength signal 116 results in a substantially polarization independent device. That is, where a crystal axis, the electric field, and the direction of propagation of signal 116 are parallel to one another, device 100 does not substantially interact with the orthogonally polarized optical beam components, thus substantially maintaining polarization independence. In one particular embodiment, the electro-optic material contained within each optical cavity 106 maintains its uniaxial property when a voltage is applied. In some embodiments, the electro-optic material comprises a crystal class having a uniaxial property that remains substantially uniaxial upon the application of an electric field. For example, the electro-optic material may comprise any electro-optic material contained within the 4, 4 mm, 3 m, 6, or 6 m crystal classes.

FIG. 2 is a block diagram of one example of a multiple-cavity device 200 configured in a transverse configuration. As used in this document the term "transverse configuration" refers to a configuration of multiple-cavity device 200 where an electric field associated with device 200 is applied perpendicular to the direction of propagation of multiple wavelength signal 216 received by device 200. In this example, multiple-cavity device 200 comprises a plurality of adjacent fundamental stacks 212a-212n. The structure and function of fundamental stacks 212 can be substantially similar to fundamental stacks 112 of FIG. 1. In this particular embodiment, each fundamental stack 212 includes an optical cavity 206 containing an electro-optic material comprising a crystalline structure with a high electro-optic coefficient.

Multiple-cavity device 200 further includes a plurality of transition layers 214 residing between pairs of fundamental stacks 212. The structure and function of transition layer 214 can be substantially similar to transition-layer 114 of FIG. 1.

In the illustrated example, device 200 also includes a pair of at least partially transparent electrodes 208 and 210 capable of generating an electric field applied substantially perpendicular to the direction of propagation of multiple wavelength signal 216. The electric field generated by electrodes 208 and 210 is capable of changing the index of refraction of the electro-optic material contained within each optical cavity 206. In this example, the electro-optic material comprises a crystalline structure whose crystal axis is parallel to the electric field generated within device 200. The magnitude of the electro-optic response depends, at least in part, on the direction in which the electric field is applied relative to the crystal axis of the electro-optic material. Applying the electric field parallel to the crystal axis of the electro-optic material is advantageous in providing the maximum electro-optic response. Although this example uses two electrodes to generate the electric field, any number of pairs of electrodes may be used without departing from the scope of the present invention.

One aspect of this disclosure recognizes a shortcoming associated with conventional multiple-cavity communication devices utilizing electro-optic materials. In particular, conventional electro-optic devices configured in a transverse configuration typically result in severe polarization dependence. A polarization dependent multiple-cavity device results because the electric field generated within the multiple-cavity device is substantially parallel to the polarization axis of one of the pair of approximately orthogonally polarized optical beam components. This typically results in a transmission of one state of polarization different from the other.

Unlike conventional multiple-cavity devices, this embodiment of multiple-cavity device 200 implements a polarization diversity technique that substantially prevents or at least reduces polarization dependence. As used in this document the term "polarization diversity technique" refers to a technique that separates the optical signal into a pair of individual beam components that are usually orthogonally polarized and processes each individual beam component separately. Implementing a polarization diversity technique provides the advantage of allowing the electric field to be applied parallel to the polarization axis of each beam component, thus creating a device that has less polarization dependence.

A polarization diversity technique implemented in a transverse configuration also enables the electro-optic material to provide a higher tuning range than a, similarly configured device in a longitudinal configuration. The improved tuning range is a result of the transverse configuration geometry enabling a larger change in the refractive index of the electro-optic material with the application of substantially similar electric fields.

FIG. 3 is a block diagram showing a pair of transversely configured multiple-cavity devices 350 implementing a polarization diversity technique 300. In this example, polarization diversity technique 300, includes at least a polarization beam splitter 320a and a polarization beam combiner 320n. Although this example shows one beam splitter 320a and one combiner 320n, any number of additional beam splitters, combiners, and/or polarization manipulating components could be used without departing from the scope of the present disclosure. Polarization beam splitter 320a operates to receive multiple wavelength signal 316 and to spatially separate signal 316 into two approximately orthogonally polarized beams 322 and 324. Polarization beam combiner 320n operates to receive two approximately orthogonally polarized beams $322_{DROP}$ and $324_{DROP}$, and to combine those beam components into signal $315_{DROP}$. Although polarization beam splitters are used in this particular example, other devices with similar functionality, such as birefringent elements or power dividers, can be used without departing from the scope of the present disclosure.

In the illustrated example, scheme 300 also includes at least a first transversely configured multiple-cavity device 350a and a second transversely configured multiple-cavity device 350b. Although this example shows two devices 350a and 350b, any number of additional multiple-cavity devices could be used without departing from the scope of the present disclosure. Device 350a operates to receive first polarized beam 322 and to selectively transmit first polarized beam $322_{DROP}$. In a similar manner, second device 350b operates to receive a second polarized beam 324 and to selectively transmit second polarized beam $324_{DROP}$. The structure and function of transversely configured multiple-cavity devices 350a and 350b can be substantially similar to transversely configured multiple-cavity device 200 of FIG. 2.

In operation, multiple wavelength signal 316 is spatially separated by polarization beam splitter 320a into two approximately orthogonally polarized multiple wavelength signal beams 322 and 324. Each beam 322, 324 is received by multiple-cavity device 350a, 350b respectively. Each multiple-cavity device 350a, 350b implements a transverse configuration. That is, the electric field generated within each device 350a and 350b is applied parallel to the polarization axis of the respective beam component within beams 322 and 324. For example, if beam 322 comprises a vertical polarization axis, the electric field applied by electrodes 308 and 310 of device 350a will be applied in the vertical direction, thus providing a substantial change in the refractive index with the applied field. The vertical beam $322_{DROP}$ is combined with the horizontally polarized beam $324_{DROP}$ to form beam $315_{DROP}$.

FIG. 4 is a graph showing one example of transmission spectra of a tunable multiple-cavity optical device. In this example, line 402 represents a first response of device 400 before the application of the electric field. Line 410 represents the resulting second response after the application of the electric field within device 400. In this example, first response 402 and second response 410 each comprise a flat-top or square-like response.

In this particular embodiment, multiple-cavity device 400 includes three fundamental stacks each comprising a pair of reflective stacks and an optical cavity. Each optical cavity comprises an electro-optic material with a thickness of approximately 100 nanometers. Multiple-cavity device 400 further includes a plurality of transition layers residing between pairs of fundamental stacks. Device 400 also includes at least a pair of electrodes capable of inducing an electric field within device 400.

In this example, the electrodes of multiple-cavity device 400 are capable of inducing an electric field that causes a change in the optical characteristics of the electro-optic materials. In one particular embodiment, a voltage source capable of generating a voltage differential of at least 10 volts operates to induce the electric field within device 400. In that embodiment, the voltage source induces an electric field that changes the index of refraction of the electro-optic material and selectively communicates the desired wavelength through device 400. The changes in the index of refraction of the electro-optic material creates an effective tuning range of approximately 10 nanometers. That is, applying a voltage source of at least 10 volts to the electrodes of device 400 causes the index of refraction to change, which enables the communication of a 10 nanometer range of wavelengths.

As shown in this figure, response 402 is capable of transmitting the 1550 nanometer wavelength optical signal from multi-cavity device 400 prior to the application of an electric field to device 400. Upon generating an electric field the indices of refraction of the electro-optic materials within the optical cavities change, resulting in a change in a wavelength of the optical, signal transmitted through device 400. The resulting response 410 comprises a response substantially similar to first response 402, but is capable of transmitting the 1551 nanometer optical signal from device 400.

Figure 5:
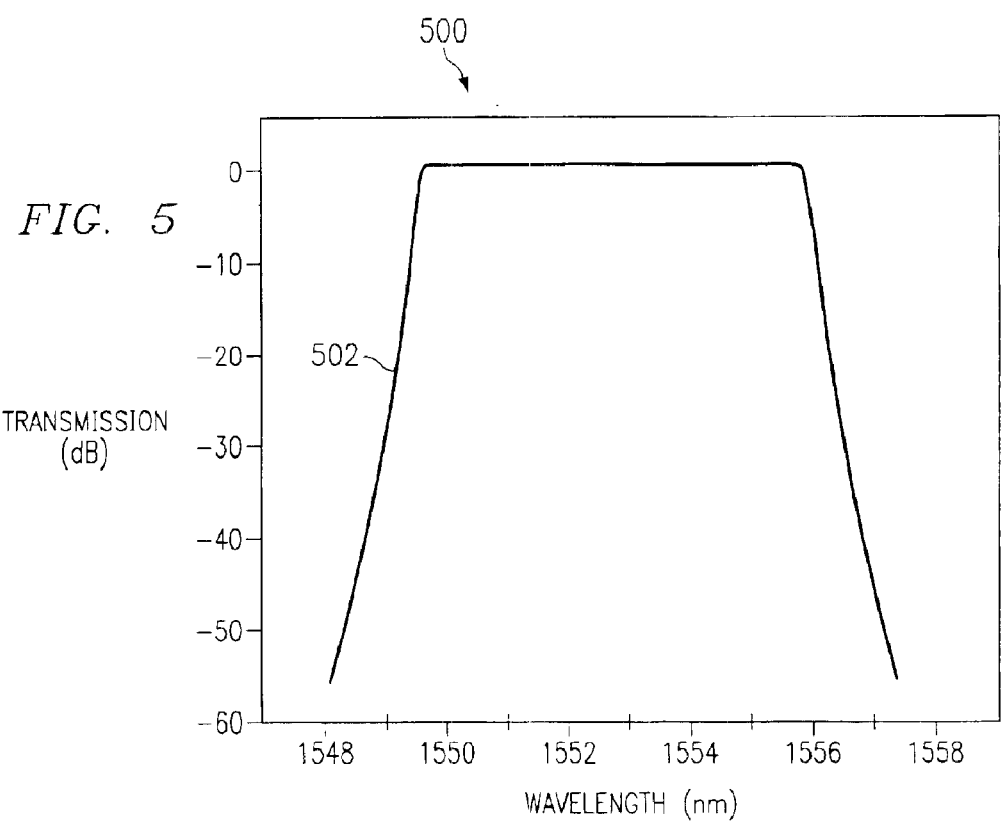
FIG. 5 is a graph showing a transmission spectrum of a wide band tunable multiple-cavity optical device.

FIG. 5 is a graph showing a transmission spectrum of a wide band tunable multiple-cavity optical device. In this example, multiple-cavity device 500 includes eight fundamental stacks each comprising a pair of reflective stacks, and an optical cavity. Each optical cavity comprises an electro-optic material with a thickness of approximately 100 nanometers. Multiple-cavity device 500 further includes a plurality of transition layers residing between adjacent pairs of fundamental stacks. Device 500 also includes at least a pair of electrodes capable of inducing an electric field within device 500.

In this example, line 502 represents the response of device 500. Response 502 comprises a flat-top or square-like response capable of transmitting a band of wavelengths including the 1550–1556 nanometer optical signals. In an alternative embodiment, device 500 is capable of selectively changing the band of wavelengths transmitted through device 500. In that embodiment, the electric field generated within device 500 can cause a change in the index of refraction of the electro-optic materials, thus shifting filter function 502 and causing device 500 to communicate a different band of wavelength signals. That is, applying or changing the electric field of device 500 will shift response 502 and cause, for example, device 500 to pass the 1556–1562 nanometer wavelength band. The electric field can be generated in a substantially similar manner as the electric field generated in FIG. 4.

FIGS. 6A through 6G are cross-sectional views showing one example of a method of forming a portion of one embodiment of a multiple-cavity device 600. Multiple-cavity device 600 may be used as a basis for forming an optical add/drop multiplexer, a multiplexer, a demultiplexer, an optical noise suppressor, a router, a modulator, a switch, or a channel filter. Particular examples and dimensions specified throughout this document are intended for exemplary purposes only, and are not intended to limit the scope of the invention. Moreover, the illustration in FIGS. 6A–6G are not intended to be to scale.

Figure 6A:
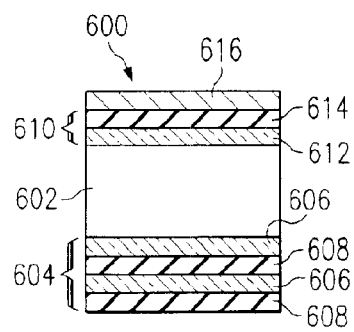
FIGS. 6A THROUGH 6G are cross-sectional views showing one example of a method of forming a portion of one embodiment of a tunable multiple-cavity optical device.

FIG. 6A shows a cross-sectional view of device 600 after formation of an anti-reflective coating 604 inwardly from substrate 602, a matching layer 610 outwardly from substrate 602, and a first conductive layer 616 outwardly from matching layer 610. Substrate 602 may comprise any at least partially transmissive material, such as, for example, silicon, sapphire, or glass. Anti-reflective coating 604 may comprise a single layer or a plurality of layers of alternating layer materials. In this example, anti-reflective coating 604 comprises a plurality of alternating layers of a first anti-reflective layer 606 and a second anti-reflective layer 608. Each anti-reflective layer 606, 608 may comprise a single material or combination of materials such as silicon, silicon dioxide, or titanium dioxide. In this particular example, first anti-reflective layer 606 comprises titanium dioxide and second anti-reflective layer 608 comprises silicon dioxide.

Forming anti-reflective coating 604 may be effected through any of a variety of processes. For example, anti-reflective coating 604 may be formed by alternately depositing first anti-reflective layer 606 and second anti-reflective layer 608. In this particular example, anti-reflective coating 604 comprises a thickness of approximately 638 nanometers.

Matching layer 610 may comprise a single layer or a plurality of layers of layer materials. In this example, matching layer 610 comprises a first layer material 612 and a second layer material 614. First layer material 612 and second layer material 614 may comprise, for example, silicon, silicon dioxide, or titanium dioxide. In this particular example, first layer material 612 comprises titanium dioxide with a thickness of approximately 28 nanometers, while second layer material 614 comprises silicon dioxide with a thickness of approximately 73 nanometers. Forming matching layer 610 may be effected, for example, by alternately depositing first layer material 612 and second layer material 614.

First conductive layer 616 may comprise any at least partially transparent material capable of supporting at least a portion of a voltage differential. For example, conductive layer 616 may comprise one or more layers of doped polysilicon or indium tin oxide. In this particular embodiment, first conductive layer 616 comprises a doped polysilicon with a thickness of approximately 216 nanometers.

Forming first conductive layer 616 may be effected through any of a variety of processes. For example, first conductive layer 616 may be formed by deposit-ng a conductive material outwardly from matching layer 610.

Figure 6B:
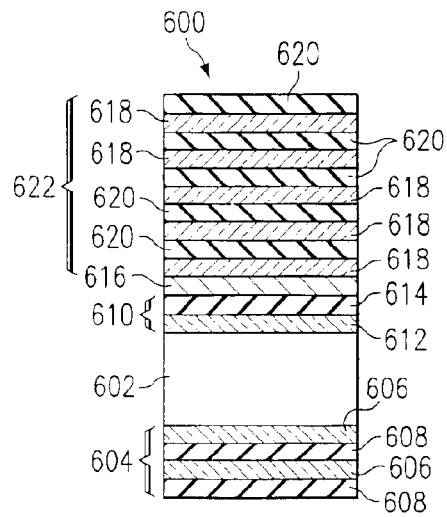

FIG. 6B shows a cross-sectional view of device 600 after formation of a first reflective stack 622 outwardly from first conductive layer 616. Reflective stack 622 may comprise a single layer or a plurality of layers of alternating layer materials. In this example, reflective stack 622 comprises a plurality of alternating layers of a first material 618 and a second material 620. First material 618 and second material 620 may comprise, for example, silicon, silicon dioxide, or titanium dioxide. In many embodiments, it is advantageous if first material 618 and second material 620 have a large difference in their refractive indices. In this particular example, first material 618 comprises titanium dioxide and second 2C material 620 comprises silicon dioxide.

Forming first reflective stack 622 may be effected through any of a variety of processes. For example, first reflective stack 622 may be formed by alternately depositing first material 618 and second material 620.

The thickness of each of the plurality of layer materials 618, 620 depends at least in part on the nominal desired wavelength (λ ref) to be communicated and on the index of refraction (n) of the layer materials. As device 600 will be a tunable optical device and will operate to selectively pass various wavelength signals, it is generally desirable to design the device assuming transmission of a "nominal wavelength." The nominal wavelength can be selected as a matter of design choice.

One possible design choice is to select a nominal wavelength in the middle of the range of wavelengths that might potentially be passed by device 600. Determining the thickness of each of the plurality of layer materials 618, 620 may be achieved by approximately:

$$\lambda ref \div 4n$$

In this particular embodiment, the thickness of first material 618 comprises approximately 142 nanometers and the thickness of second material 620 comprises approximately 268 nanometers. In that embodiment, the desired nominal wavelength comprises approximately 1550 nanometers and the total thickness of reflective stack 622 comprises approximately 2 microns.

Combining each first material 618 and second material 620 forms a period within first reflective stack 622. The number of periods within reflective stack 622 depends at least in part on the desired reflectivity of device 600. In this particular embodiment, reflective stack 622 comprises 5 periods. Although reflective stack 622 comprises 5 periods in this example, reflective stack 622 could comprise another number of periods without departing from the scope of the present invention.

Figure 6C:
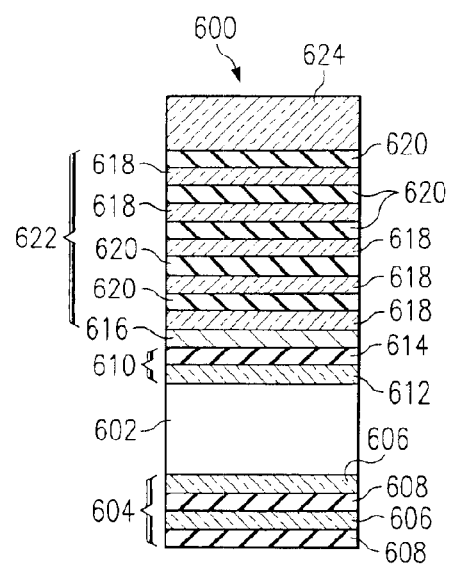

FIG. 6C shows a cross-sectional view of device 600 after formation of a first optical cavity layer 624. First optical cavity layer 624 may comprise any material with a relatively high electro-optic coefficient. Lithium niobate, lithium tantalate, strontium barium niobate, and lanthanum modified lead zirconate titanate provide just a few examples. In this particular embodiment, first optical cavity layer 624 comprises strontium barium niobate. In some embodiments, first optical cavity layer 624 may comprise an electro-optic material with a substantially crystalline structure. For example, the electro-optic material may comprise any electro-optic material contained within the 4, 4 mm, 3 m, 6, or 6 m crystal classes.

Forming first optical cavity layer 624 may be effected through any of a variety of processes. For example, optical cavity layer 624 may be formed by depositing an electro-optic material. In some embodiments, after depositing the electro-optic material, the electro-optic material can be subjected to a crystallization process to achieve a crystalline like behavior in the electro-optic material. As used in this document, the term "crystallization" refers to a process capable of changing a material from a relatively amorphous state to a more structured state. In this particular embodiment, the deposited electro-optic material is immediately subjected to a thermal cycle that induces crystallization and orients a crystal axis. In other embodiments, the electro-optic material may be subjected to a thermal cycle after formation of a reflective stack or a portion of a reflective stack outwardly from electro-optic cavity layer 624. In still other embodiments, the electro-optic material may be subjected to a thermal cycle after formation of the entire multiple-cavity device 600. In some embodiments, the crystallization includes an annealing process to relieve stresses formed within the electro-optic material.

In various embodiments, the electro-optic material is subject to a poling process to substantially orient a crystal axis as desired. In one particular embodiment, the poling process may comprise all or a portion of the crystallization process. In other embodiments, the electro-optic material may be subject to poling after completion of the crystallization process.

The thickness of first optical cavity layer 624 depends at least in part on a desired tuning range, a desired maximum operating voltage, and a desired wavelength or wavelengths to be communicated. In this particular embodiment, first optical cavity layer 624 comprises strontium barium niobate with a thickness of approximately one (1) micron. Although first cavity layer comprises three (3) one-half wavelengths optical thickness (normalized for the index of refraction of the material) in this example, any integer multiple of half wavelength optical thickness could be used without departing from the scope of the present disclosure. In this example, nominal wavelength comprises approximately 1550 nanometers.

In this example, first optical cavity layer 624 resides directly outwardly from first reflective stack 622. Alternatively, one or more buffer layers, or one or more conductive layers, or a combination of buffer layers and conductive layers could reside between first reflective stack 622 and first optical cavity layer 624. In one alternative embodiment, a buffer layer is formed between first reflective stack 622 and first optical cavity layer 624. In addition, another buffer layer is formed outwardly from first optical cavity layer 624. Each buffer layer may comprise, for example, silicon, silicon dioxide, or titanium dioxide.

In another alternative embodiment, a conductive layer could reside between first reflective stack 622 and first optical cavity layer 624. In addition, another conductive layer is formed outwardly from first optical cavity layer 624. The structure and function of each conductive layer can be substantially similar to first conductive layer 616. Placing a pair of conductive layers around first optical cavity layer 624 can be advantageous in a multiple-cavity device where each of the plurality of optical cavity layers comprise a substantially different layer thickness. In this embodiment, first conductive layer 616 does not reside between matching layer 610 and first reflective stack 622.

Figure 6D:
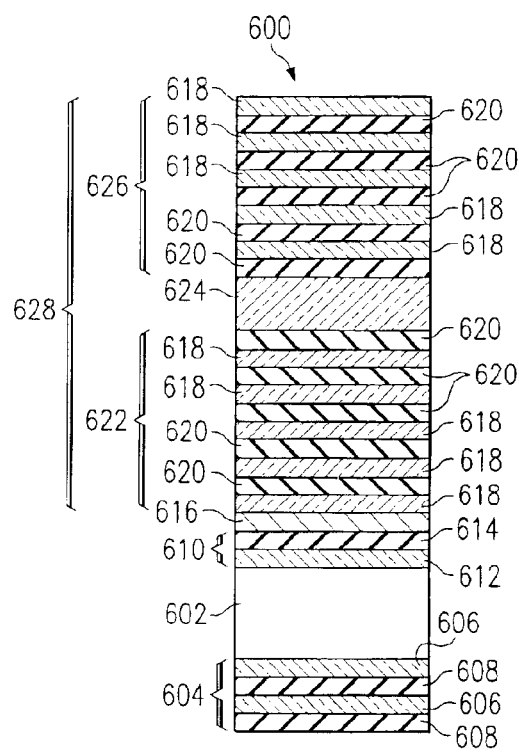

FIG. 6D shows a cross-sectional view of device 600 after formation of a second reflective stack 626. The structure and function of second reflective stack 626 can be substantially similar to first reflective stack 622. In this particular embodiment, second reflective stack 626 and first reflective stack 622 each comprise an equal number of periods of similar layer materials and an approximately equal reflective stack thickness.

Forming second reflective stack 626 may be effected through any of a variety of processes. For example, second reflective stack 626 can be formed by depositing a plurality of layer materials outwardly from first optical cavity layer 624. In this particular embodiment, second reflective stack 626 may be formed by alternately depositing second material 620 and first material 618. As shown in this figure, the combination of first reflective stack 622, first optical cavity layer 624, and second reflective stack 626 form a first fundamental stack 628.

Figure 6E:
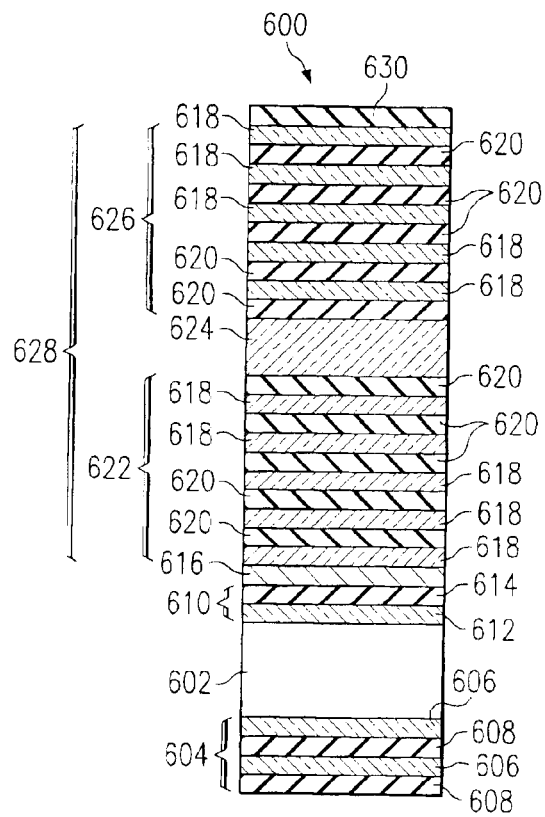

FIG. 6E shows a cross sectional view of device 600 after formation of a first transition layer 630 outwardly from first fundamental stack 628. First transition layer 630 may comprise any substantially transparent material capable of coupling first fundamental stack 628 to additional fundamental stacks. It is advantageous if first transition layer 630 and the final layer material, of second reflective stack 626 have a large difference in their refractive indices.

Forming transition layer 630 may be effected through any of a variety of process. For example, transition layer 630 may be formed by depositing a substantially transparent material.

The thickness of transition layer 630 depends at least in part on the desired wavelength to be communicated and the index of refraction of the layer material. In this particular example, transition layer 630 comprises a single quarter wavelength optical thickness (normalized for the index of refraction of the material). Transition layer 114 could, however, comprise any integer multiple of quarter wavelength optical thickness without departing from the scope of the present disclosure. In this particular example, first transition layer 630 comprises silicon dioxide with a thickness of approximately 268 nanometers.

In this example, transition layer 630 resides directly outwardly from first fundamental stack 628. Alternatively, a second conductive layer could reside outwardly from first fundamental stack 628. The structure and function of the second conductive layer, can be substantially similar to first conductive layer 616. In that embodiment, device 600 would comprise a single cavity device, without transition layer 630.

Figure 6F:
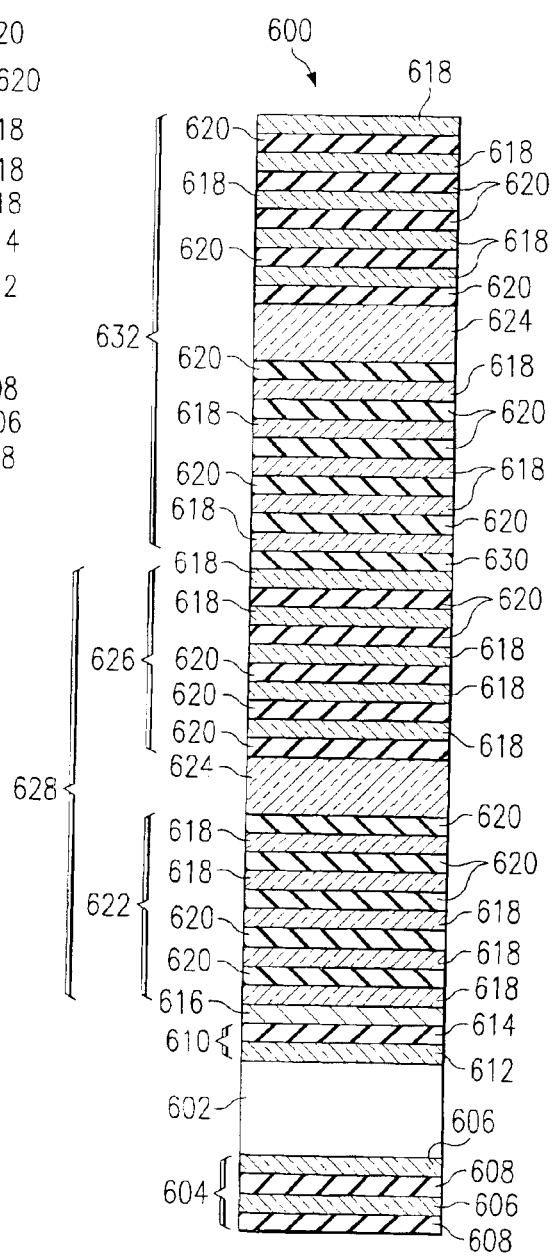

FIG. 6F shows a cross-sectional view of device 600 after formation of a second fundamental stack 632 outwardly from first transition layer 630. The structure and function of second fundamental stack 632, can be substantially similar to first fundamental stack 628. In this particular embodiment, first fundamental stack 628 and second fundamental stack 632 each comprise a first reflective stack 622 and a second reflective stack 626. Each reflective stack 622 and 626 comprises an equal number of periods of similar layer materials and an approximately equal stack thickness. In addition, first fundamental stack 628 and second fundamental stack 632 each comprise an optical cavity layer 624 with a similar material and an approximately equal cavity layer, thickness.

In this example, each optical cavity layer 624 comprises an approximately equal cavity layer thickness. Alternatively, one or more of the optical cavity layers may each comprise a different layer thickness. In that embodiment, a pair of conductive layers reside around each optical cavity layer.

Figures 6G, 7:
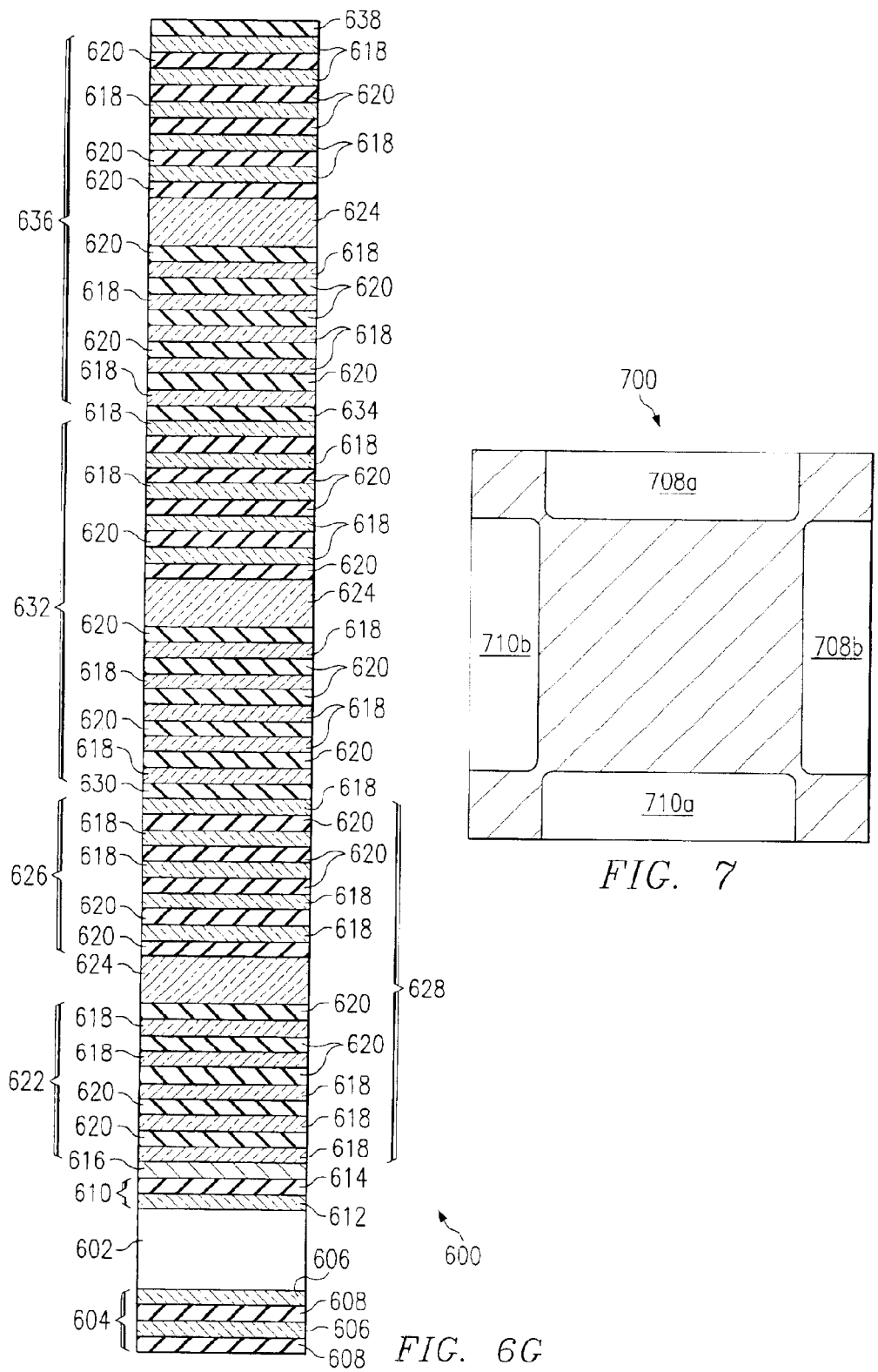
FIG. 7 shows a plan view of a traverse configuration of a tunable multiple-cavity optical device after the formation of at least a pair of conductors.

FIG. 6G shows a cross-sectional view of device 600 after formation of a second transition layer 634 outwardly from fundamental stack 632, a third fundamental stack 636 outwardly from transition layer 634, and a second conductive layer 638 outwardly from th-rd fundamental stack 636. The structure and function of second transition layer 634, can be substantially similar to first transition layer 630. In this particular embodiment, first transition layer 630 and second transition layer 634 each comprise a substantially similar layer material and an approximately equal thickness.

The structure and function of third fundamental stack 636 can be substantially similar to first fundamental stack 628. In this particular embodiment, first fundamental stack 628 and third fundamental stack 636 each comprise a first reflective stack 622 and a second reflective stack 626. Each reflective stack 622, 626 comprises an equal number of periods of similar layer materials and an approximately equal stack thickness. In addition, first fundamental stack 628 and third fundamental stack 636 each comprise an optical cavity layer with a substantially similar layer material and an approximately equal cavity thickness.

The structure and function of second conductive layer 638 can be substantially similar to first conductive layer 616. In this particular embodiment, first conductive layer 616 and second conductive layer 638 each comprises a similar layer material and an approximately equal layer thickness.

In this example, second conductive layer 638 resides directly outwardly from third fundamental stack 636 without any additional layers disposed between them. Alternatively, one or more additional layers could reside between second conductive layer 638 and third fundamental stack 636 to substantially control pass-band ripple. For example, in a three cavity design, either a higher or a lower index of refraction dielectric material comprising a one-quarter wavelength optical thickness of the desired nominal wavelength (normalized by the index of refraction for that material) may be formed outwardly from third fundamental stack 636. It is advantageous if the last layer material of third fundamental stack 636 and the additional layer have a large difference in their refractive indices. In one particular embodiment, an additional layer comprising silicon dioxide with a thickness of approximately 268 nanometers is deposited to control pass-band ripple. In various embodiments, the additional layer operates to control the ripple penalty; to approximately three (3) decibels or less, two (2) decibels or less, or one (1) decibel or less.

In the illustrated embodiment, multiple-cavity device 600 includes three fundamental stacks each separated by a transition layer. Although this example has three fundamental stacks each separated by a transition layer, any number of additional fundamental stacks and transition layers may be used without departing from the scope of the present disclosure. In one particular embodiment, multiple-cavity device 600 includes eight fundamental stacks deposited between first conductive layer 616 and second conductive layer 638. In that embodiment, each fundamental stack is separated by a transition layer.

In the illustrated embodiment, first conductive layer 616 and second conductive layer 638 support an electric field parallel to the direction of propagation of a multiple wavelength signal. Alternatively, the conductive layers could be formed to induce an electric field that is substantially perpendicular to the direction of propagation of the multiple wavelength signal. In that embodiment, first fundamental stack 628, can be formed outwardly from matching layer 610 and a single conductive layer can be formed outwardly from third fundamental stack 636. After the formation of the conductive layer, the conductive layer can be patterned and etched to form at least a pair of conductors.

FIG. 7 shows a plan view of a transverse multiple-cavity device 700 after the formation of at least a pair of conductors. In this embodiment, conductors 708 and 710 are configured to generate an electric field perpendicular to the direction of propagation of a multiple wavelength signal. To generate an electric field perpendicular to the direction of propagation, a voltage may be applied between electrodes 708a and 710a or 708b and 710b as desired. The structure and function of conductors 708 and 710 can be substantially similar to conductive layers 616 and 638 of FIG. 6. In this particular embodiment, conductor 708 and conductor 710 each comprise a similar conductive material and an approximately equal conductive material thickness. In this particular example, conductors 708 and 710 may be formed, for example, by patterning and etching the conductive layer using photo resist mask and etch techniques.

2. Optical Add/Drop Multiplexer Architecture

Figure 8A:
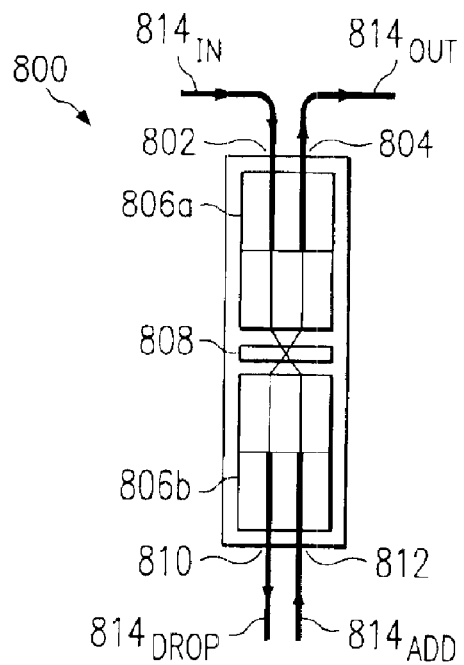
FIGS. 8A and 8B are block diagrams illustrating exemplary embodiments of optical add/drop multiplexers (OADM) incorporating an optical filter.
Figure 8B:
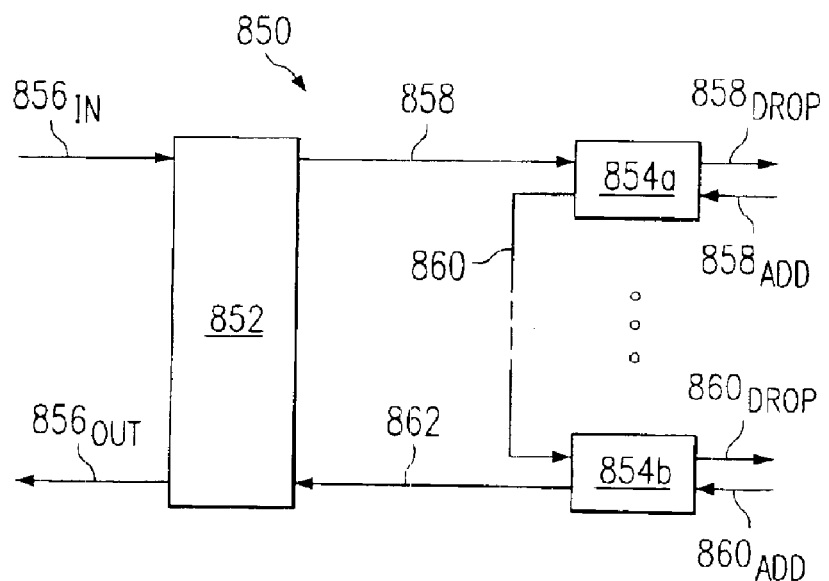

FIGS. 8A and 8B are block diagrams illustrating exemplary embodiments of optical add/drop multiplexers (OADM) incorporating an optical filter 808. Throughout this disclosure the terms "add/drop," "adding/dropping," and "added/dropped" refer to either the operation of adding one or more wavelength signals, dropping one or more wavelength signals, or adding wavelength signals and dropping others. Those terms are not intended to require both add and drop operation, but are also not intended to exclude add and drop operations. The terms are merely used as a convenient way to refer to either adding or dropping or both adding and dropping operations.

In some embodiments, the structure and function of optical filter 808 can be substantially similar to multiple cavity device 100 of FIG. 1. Inventive aspects of the OADM architecture are not, however, limited to the use of multiple cavity thin film filters. Other tunable optical devices could be used. For example, micro electromechanical switching (MEMS) devices or other tunable optical devices could be used.

Optical filter 808 can operate in transmission or reflection mode. That is, filter 808 can operate to transmit selected wavelengths while reflecting others, or can operate to reflect selected wavelengths while transmitting others. For ease of description, the following discussion assumes that filter 808 operates in transmission mode, transmitting a selected wavelength or range of wavelengths, while reflecting others.

FIG. 8A is a block diagram illustrating an exemplary embodiment of an OADM 800 incorporating an optical filter 808. In various embodiments, OADM 800 can comprise a narrow band OADM or a wide band OADM. In this particular embodiment, OADM 800 comprises a static OADM capable of adding/dropping the same wavelengths or band of wavelengths. In an alternative embodiment, OADM 800 may comprise a tunable OADM capable of selectively adding/dropping different wavelengths or bands of wavelengths.

In this embodiment, optical filter 808 operates to remove one or more wavelength signals $814_{DROP}$ from a multiple wavelength signal 814 and to add one or more wavelength signals $814_{ADD}$ to multiple wavelength signal 814. In this particular embodiment, signals $814_{DROP}$ and $814_{ADD}$ comprise a band of multiple wavelength signals.

In this embodiment, OADM 800 includes at least a first lens 806a and a second lens 806b. In this example, lenses 806 comprise gradient index ("GRIN") lenses. Although this example uses two GRIN lenses 806a and 806b, any additional number or type of lenses may be used without departing from the scope of the present disclosure. First GRIN lens 806a operates to direct multiple wavelength signal $814_{IN}$ received from an input port 802 to optical filter 808. First GRIN lens 806a also operates to direct multiple wavelength signal $814_{out}$ received from optical filter 808 to an output port 804 for further communication from OADM 800. In a similar manner, second GRIN lens 806b operates to direct signal. $814_{DROP}$ received from filter 808 to a drop port 810. Second GRIN lens 806b also operates to direct signal $814_{ADD}$ received from an add port 812 to filter 808.

FIG. 8B is a block diagram illustration an exemplary embodiment of an OADM 850 incorporating a wide band OADM 852 and a plurality of narrower band OADMs 854. OADM 850 is operable to remove one or more bands of wavelength signals 858 from a multiple wavelength signal 856 and to add one or more bands of wavelength signals 862 to multiple wavelength signal 856. In this example, OADM 850 comprises a static OADM capable of adding/dropping the same wavelengths or band of wavelengths. In an alternative embodiment, OADM 800 may comprise a tunable OADM capable of selectively adding/dropping different wavelengths or bands of wavelengths. Implementing a wide band OADM to separate one or more bands of wavelengths from a multiple wavelength signal and a plurality of narrower band OADMs to further separate the one or more bands of wavelengths separated by the wide band OADM is advantageous in reducing losses associated with OADMs.

In this example, OADM 850 includes wide band OADM 852. In this particular embodiment, the structure and function of OADM 852 can be substantially similar to OADM 800 of FIG. 8A. OADM 852 operates to remove at least a, first band of signals 858 from multiple wavelength signal $856_{IN}$ received by OADM 852. In one particular embodiment, first band of signals 858 comprises a relatively wide bandwidth of multiple wavelength signals. OADM 852 also operates to combine a second band of signals 862 with a portion of multiple wavelength signal $856_{IN}$ reflected from OADM 852 to form multiple wavelength signal $856_{OUT}$.

In the illustrated embodiment, OADM 850 comprises at least a first narrower band OADM 854a and a second narrower band OADM 854b. Although this example includes two narrower band OADMs 854a and 854b, any number of additional narrower band OADMs may be implemented without departing from the scope of the present disclosure. In, this particular embodiment, the structure and function of OADMs 854a and 854b can be substantially similar to OADM 800 of FIG. 8A. First OADM 854a operates to remove one or more wavelength signals $858_{DROP}$ from signal 858 received by OADM 854a. First OADM 854a also operates to comb-ne one or more wavelength signals $858_{ADD}$ with a portion of signal 858 reflected from OADM 854a to form multiple wavelength signal 860. In a similar manner, second OADM 854b operates to remove one or more wavelength signals $860_{DROP}$ from signal 860 received by OADM 854b. Second OADM 854b also operates to combine one or more wavelength signals $860_{ADD}$ with a portion of signal 860 reflected from OADM 854b to form multiple wavelength signal 862.

Figure 9A:
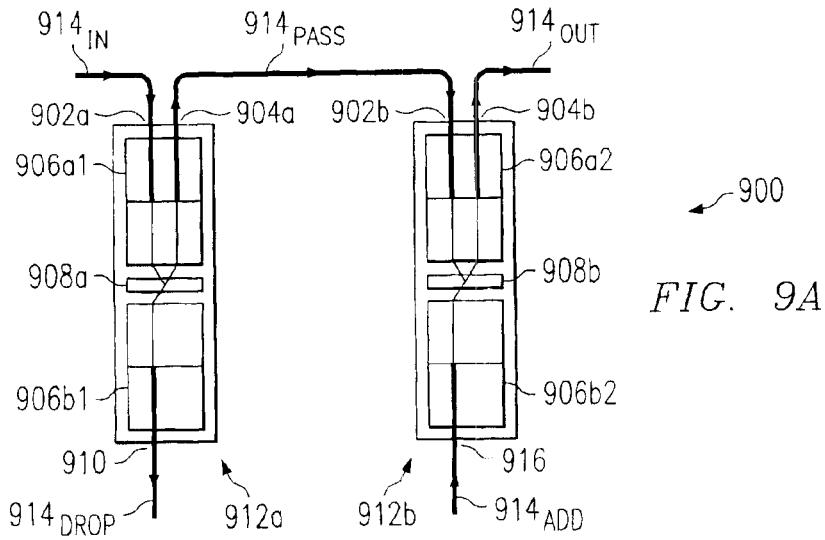
FIGS. 9A and 9B are block diagrams illustrating exemplary embodiments of optical add/drop multiplexers (OADM) incorporating an optical filter.
Figure 9B:
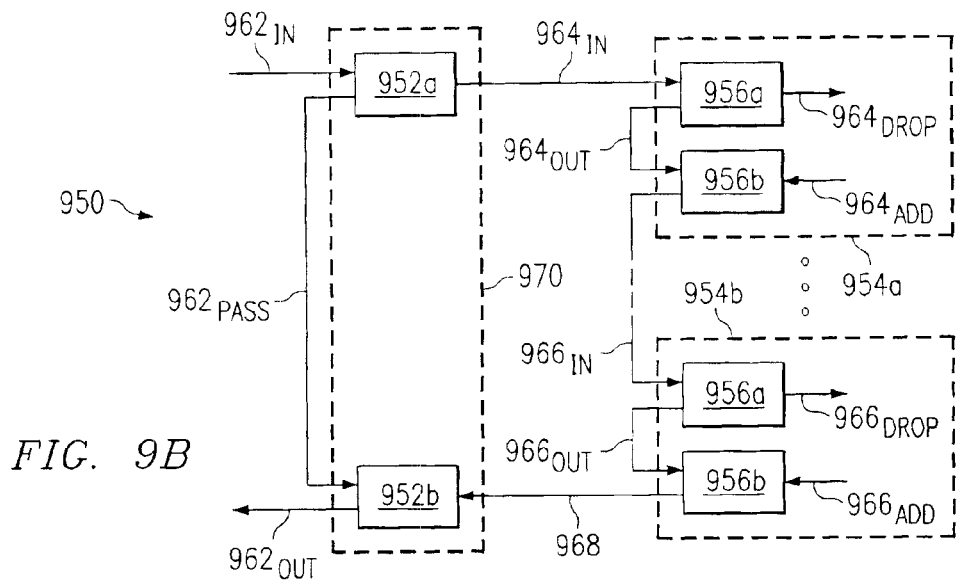

FIGS. 9A and 9B are block diagrams illustrating exemplary embodiments of optical add/drop multiplexers incorporating a serial combination of optical filters 908. Implementing serial combinations of multiple cavity filters to form an OADM is advantageous in minimizing the interaction, and hence the interference, between add/drop signals.

In these particular embodiments, the structure and function of optical filters 908 can be substantially similar to multiple cavity device 100 of FIG. 1. Inventive aspects of the OADM architecture are not, however, limited to the use of multiple cavity thin film filters. Other tunable optical devices could be used. For example, micro electromechanical switching (MEMS) devices or other tunable optical devices could be used.

Optical filter 908 can operate in transmission or reflection mode. That is, filter 908 can operate to transmit selected wavelengths while reflecting others, or can operate to reflect selected wavelengths while transmitting others. For ease of description, the following discussion assumes that filter 908 operates in transmission mode, transmitting a selected wavelength or range of wavelengths, while reflecting others.

FIG. 9A is a block diagram illustrating an exemplary embodiment of an OADM 900 incorporating a serial combination of optical filters 908. In various embodiments, OADM 900 can comprise a narrower band OADM or a wide band OADM. In this particular embodiment, OADM 900 comprises a static OADM capable of adding/dropping the same wavelengths or band of wavelengths. In an alternative embodiment, OADM 900 may comprise a tunable OADM capable of selectively adding/dropping different wavelengths or bands of wavelengths.

In this embodiment, optical filter 908a operates to remove one or more wavelength signals $914_{DROP}$ from a multiple wavelength signal 914, while optical filter 908b operates to add one or more wavelength signals $914_{ADD}$ to multiple wavelength signal 914. In this particular embodiment, signal $914_{DROP}$ comprises a band of multiple wavelength signals.

In this embodiment, OADM 900 includes a plurality of OADM modules 912. First OADM module 912a includes at least a first lens 906a1 and a second lens 906b1. In th-s example, lenses 906a1 and 906b1 each comprise GRIN lenses. Although this example uses two GRIN lenses 906a1 and 906b1, any additional number or types of lenses may be used without departing from the scope of the present disclosure. First GRIN lens 906a1 operates to direct multiple wavelength signal $914_{IN}$ received from an input port 902a to optical filter 908a. First GRIN lens 906a1 also operates to direct multiple wavelength signal $914_{PASS}$ reflected from optical filter 908a to an output port 904a for transmission to second OADM module 912b. Second GRIN lens 906b1 operates to direct signal $914_{DROP}$ received from filter 908a to a drop port 910.

In this embodiment, second OADM module 912b operates to add one or more wavelength signals to multiple wavelength signal $914_{PASS}$ to from multiple wavelength signal $914_{OUT}$ for communication from OADM 900. The structure of second OADM module 912b can be substantially similar to first OADM module 912a. First GRIN lens 906a2 operates to direct multiple wavelength signal $914_{PASS}$ received from an input port 902b to optical filter 908b. First GRIN lens 906a2 also operates to direct multiple wavelength signal $914_{OUT}$ reflected from and passed through optical filter 908b to an output port 904b. Second GRIN lens 906b2 operates to direct signal $914_{ADD}$ received from an add port 916 to filter 908b. In this particular embodiment, signal $914_{ADD}$ comprises a band of multiple wavelength signals.

FIG. 9B is a block diagram illustrating an exemplary embodiment of an OADM 950 incorporating a wide band OADM 970 and a plurality of narrower band OADMs 954. OADM 950 is operable to remove one or more bands of wavelength signals 964 from a multiple wavelength signal 962 and to add one or more bands of wavelength signals 968 to multiple wavelength signal 962. In this example, OADM 950 comprises a static OADM capable of adding/dropping the same wavelengths or band of wavelengths. In an alternative embodiment, OADM 900 may comprise a tunable OADM capable of selectively adding/dropping different wavelengths or bands of wavelengths. Implementing a wide band OADM to separate one or more bands of wavelengths from a multiple wavelength signal and a plurality of narrower band OADMs to further separate the wavelength signals separated by the wide band OADM is advantageous in reducing losses associated with OADMs.

In this embodiment, OADM 950 includes a wide band OADM 97C. In this example, OADM 970 includes at least a first OADM module 952a and a second OADM module 952b. In this particular embodiment, the structure and function of first OADM module 952a and second OADM module 952b can be substantially similar to OADM modules 912a and 912b of FIG. 9A, respectively. First OADM module 952a operates to remove at least a first band of signals $964_{IN}$ from multiple wavelength signal $962_{IN}$. In one particular embodiment, first band of signals $964_{IN}$ comprises a relatively wide bandwidth of multiple wavelength signals. First OADM module 952a also operates to direct a multiple wavelength signal $962_{PASS}$ to second OADM module 952b. In a similar manner, second OADM module 952b operates to combine a second band of signals 968 with multiple wavelength signal $962_{PASS}$ to form multiple wavelength signal $962_{OUT}$.

In the illustrated embodiment, OADM 950 includes at least a first narrower band OADM 954a and a second narrower band OADM 954b. Although this example includes two narrower band OADMs 954a and 954b, any number of additional narrower band OADMs may be implemented without departing from the scope of the present disclosure. In this example, each OADM 954 includes at least a first OADM module 956a and a second OADM module 956b. In this particular embodiment, the structure and function of first OADM module 956a and second OADM module 956b can be substantially similar to OADM modules 912a and 912b of FIG. 9A, respectively. First OADM 954a operates to remove one or more wavelength signals $\Gamma_{DROP}$ from signal $964_{IN}$ received by OADM 954a. First OADM 954a also operates to combine one or more wavelength signals $964_{ADD}$ with a multiple wavelength signal $964_{OUT}$ reflected from OADM 954a to form a multiple wavelength signal $966_{IN}$. In a similar manner, second OADM 954b operates to remove one or more wavelength signals $966_{DROP}$ from signal $966_{IN}$. Second OADM 954b also operates to combine one or more wavelength signals $966_{ADD}$ with a multiple wavelength signal $966_{OUT}$ reflected from or transmitted through OADM 954b to form multiple wavelength signal 968.

3. Tunable Non-Blocking Optical Add/Drop Multiplexer

Figure 10:
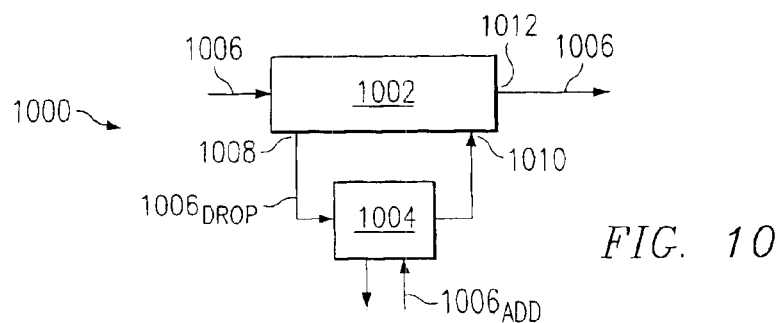
FIG. 10 is a block diagram of a non-blocking tunable device.

FIG. 10 is a block diagram illustrating a non-blocking tunable device 1000. As used throughout this document the term "non-blocking" refers to a tunable device that allows substantially all wavelengths received to pass through the device without significant attenuation while the device is being tuned. A "non-blocking" device does not significantly block pass-through wavelengths while the device is being tuned. In this embodiment, non-blocking tunable device 1000 includes a tunable filter 1002 operable to selectively remove one or more bands of wavelength signals $1006_{DROP}$ from a multiple wavelength signal 1006. Tunable filter 1002 also operates to selectively add one or more bands of wavelength signals $1006_{ADD}$ to signal 1006.

Tunable filter 1002 may comprise any device capable of selectively adding/dropping different bands of wavelengths, such as, for example, a multiple cavity thin film device or a plurality of gratings. Tunable filter 1002 can operate in transmission or reflection mode. That is, filter 1002 can operate to transmit selected wavelengths while reflecting others, or can operate to reflect selected wavelengths while transmitting others. For ease of description, the following discussion assumes that filter 1002 operates in reflection mode, reflecting a selected wavelength or range of wavelengths, while transmitting others.

In this embodiment, non-blocking tunable device 1000 includes a switch 1004 coupled between a drop port 1008 and an add port 1010 of filter 1002. As used throughout this document the terms "drop port" and "add port" refer to those portions of the tunable device that function to add/drop one or more wavelength signals from the tunable device. Switch 1004 may comprise any device capable of at least two operating modes. Switch 1004 operates in a first operating mode during tuning operations of filter 1002. During tun-ng operations, switch 1004 operates to couple drop port 1008 to add port 1010. Coupling drop port 1008 to add port 1010 enables signal $1006_{DROP}$ to be recombined with that portion of signal 1006 that passed through filter 1002. In that operating mode, switch 1004 also operates to substantially prevent signal $1006_{ADD}$, when present, from being combined with the portion of signal 1006 that passed through filter 1002.

Switch 1004 operates in a second operating mode during steady-state or non-tuning operating conditions of filter 1002. In the second operating mode, switch 1004 decouples drop port 1008 and add port 1010, and operates to drop one or more bands of wavelength signals $1006_{DROP}$ from multiple wavelength signal 1006. In that operating mode, switch 1004 also operates to facilitate the combination of one or more bands of wavelength signals $1006_{ADD}$ to the portion of multiple wavelength signal 1006 that passed through filter 1002. In some embodiments, a synchronizer can be coupled to device 1000 to synchronize portions of signal 1006 traveling through filter 1002 with those signal portions directed through switch 1004. This can operate to deal with any latency that can be experienced by signals traversing different signal paths.

FIGS. 11A and 113 are block diagrams illustrating exemplary embodiments of non-blocking electro-optic tunable devices. In these particular embodiments, each electro-optic tunable device comprises at least one multiple cavity device 1102 or 1152. The structure and function of multiple cavity device 1102 or 1152 can be substantially similar to multiple cavity device 100 of FIG. 1.

Each multiple cavity device 1102 or 1152 can operate in transmission or reflection mode. That is, device 1102 or 1152 can operate to transmit selected wavelengths while reflecting others, or can operate to reflect selected wavelengths while transmitting others. For ease of description, the following discussion assumes that device 1102 or 1152 operates in transmission mode, transmitting a selected wavelength or range of wavelengths, while reflecting others.

FIG. 11A is a block diagram illustrating an exemplary embodiment of a non-blocking electro-optic tunable device 1100 implementing a serial combination of multiple cavity devices 1102. Device 1100 includes at least a first multiple cavity device 1102a and a second multiple cavity device 1102b. Although this example includes two multiple cavity devices 1102a and 1102b, any additional number of multiple cavity devices may be included without departing from the scope of the present disclosure. In this example, multiple cavity device 1102a operates to selectively add/drop one or more wavelength signals from a multiple wavelength signal by applying an electric field to device 1102a. The structure and function of device 1102a can be substantially similar to multiple cavity device 100 of FIG. 1. In this particular embodiment, multiple cavity device 1102a comprises three (3) fundamental stacks. Although device 1102a comprises three fundamental stacks in this example, any additional number of fundamental stacks can be used without departing from the scope of the present disclosure.

In this embodiment, second multiple cavity device 1102b is not physically coupled to first multiple cavity, device 1102a. In an alternative embodiment, device 1102b can be physically coupled to device 1102a. In either this embodiment or the alternative embodiment, second multiple cavity device 1102b is not coherently coupled to first multiple cavity device 1102a. In the alternative embodiment, second multiple cavity device 1102b operates to either transmit or reflect the multiple wavelength signal selectively added/dropped from first multiple cavity device 1102a. In various embodiments, second multiple cavity device 1102b can comprise, for example, a switch or a modulator. In this particular embodiment, the function of device 1102b can be substantially similar to switch 1004 of FIG. 10. The structure of device 1102b can be substantially similar to multiple cavity device 1102a.

In operation, multiple cavity device 1102b is either optically matched or optically complementary to multiple cavity device 1102a. When devices 1102b and 1102a are complementary, non-blocking electro-optic tunable device 1100 substantially prevents all wavelength signals from being added/dropped. Multiple cavity device 1102b is complementary to device 1102a during the period that device 1102a is being tuned to add/drop a desired wavelength signal or signals. In this particular embodiment, to achieve a complementary state between devices 1102a and 1102b, substantially different voltages are applied to each device. For example, if it is desired to tune device 1102a to add/drop longer wavelength signals, the voltage of device 1102b can be modified so that the optical response of device 1102b shifts toward the shorter wavelength signals. Shifting device 1102b toward the shorter wavelength signals, while device 1102a is being tuned to add/drop longer wavelength signals substantially prevents all wavelength signals from being added/dropped.

FIG. 11B is a block diagram illustrating an, exemplary embodiment of a non-blocking electro-optic tunable device 1150 implementing a serial combination of a multiple cavity device 1152 and a tunable anti-reflective coating 1154. Device 1150 includes a tunable multiple cavity device 1152 operable to selectively add/drop one or more wavelength signals from a multiple wavelength signal by applying an electric field to device 1152. The structure and function of device 1152 can be substantially similar to multiple cavity device 100 of FIG. 1. In this particular embodiment, multiple cavity device 1152 comprises three (3) fundamental stacks. Although device 1152 comprises three fundamental stacks in this example, any additional number of fundamental stacks can be used without departing from the scope of the present disclosure.

In this particular embodiment, non-blocking electro-optic tunable device 1150 includes a tunable anti-reflective coating 1154 co-located on a common substrate with multiple cavity device 1152. Anti-reflective coating 1154 may comprise any material with an optical characteristic capable of being manipulated by the application of an electric field, such as, for example an electro-optic material. Tunable anti-reflective coating 1154 operates to either transmit or reflect the multiple wavelength signal selectively added/dropped from tunable multiple cavity device 1152. In various embodiments, tunable anti-reflective coating 1154 can comprise, for example, a switch or a modulator. In this particular embodiment, the function of coating 1154 can be substantially similar to switch 1004 of FIG. 10.

In operation, anti-reflective coating 1154 is either optically matched or optically complementary to multiple cavity device 1152. When coating 1154 and device 1152 are complementary, non-blocking electro-optic tunable device 1150 substantially prevents all wavelength signals from being added/dropped. Anti-reflective coating 1154 is complementary to device 1152 during the period that device 1152 is being tuned to add/drop a different wavelength signal or signals.

In one particular embodiment, coating 1154 comprises a substantially similar configuration to the optical cavities of device 1152. To achieve a complementary state between coating 1154 and device 1152, significantly different voltages are applied to each. For example, if it is desired to tune device 1152 to add/drop longer wavelength signals, the voltage applied to coating 1154 can be modified so that the optical response of coating 1154 shifts toward the shorter wavelength signals. Shifting coating 1154 toward the shorter wavelengths signals, while device 1152 is being tuned to add/drop longer wavelength signals substantially prevents all wavelength signals from being added/dropped.

In another embodiment, coating 1154 comprises a substantially different configuration than the configuration of the cavities of device 1152. In this example, coating 1154 can comprise a configuration capable of passing a wide range of wavelengths. Configuring coating 1154 to have a wide pass-band provides the advantage of allowing the use of a single configuration in many non-blocking tunable optical devices. Applying a voltage to coating 1154, sufficient to shift the wide pass-band away from the desired wavelength signal, results in coating 1154 being complementary to device 1152.

FIG. 12 is a block diagram illustrating an exemplary embodiment of a tunable non-blocking OADM 1200 implementing a serial combination of non-blocking electro-optic tunable optical devices 1208. OADM 1200 is operable to selectively remove one or more wavelength signals $1214_{DROP}$ from a multiple wavelength signal $1214_{IN}$ by applying an electric field to non-blocking electro-optic tunable devices 1208. OADM 1200 also operates to selectively add ore or more wavelength signals $1214_{ADD}$ to a multiple wavelength signal $1214_{PASS}$. In various embodiments, OADM 1200 can comprise a narrow band OADM or a wide band OADM. Implementing a serial combination of non-blocking electro-optic tunable devices 1208 to form OADM 1200 is advantageous in minimizing the interaction, and hence the interference, between add/drop signals.

In various embodiments, the structure and function of non-blocking electro-optic tunable devices 1208 can be substantially similar a non-blocking electro-optic tunable device 1100 and/or 1150 of FIGS. 11A and 11B; respectively. Each non-blocking electro-optic tunable device 1208 can operate in transmission or reflection mode. That is, each device 1208 can operate to transmit selected wavelengths while reflecting others, or can operate to reflect selected wavelengths while transmitting others. For ease of description, the following discussion assumes that each device 1208 operates in transmission mode, transmitting a selected wavelength or range of wavelengths, while reflecting others.

In the illustrated embodiment, tunable non-blocking OADM 1200 includes at least a first OADM module 1212a and a second OADM module 1212b. The structure of OADM modules 1212a and 1212b can be substantially similar to OADM modules 912a and 912b of FIG. 9A, respectively. First OADM module 1212a operates to selectively remove one or more wavelength signals $1214_{DROP}$ from multiple wavelength signal $1214_{IN}$ to form multiple wavelength signal $1214_{PASS}$. In a similar manner second OADM module 1212b operates to selectively add one or more wavelength signals $1214_{ADD}$ to multiple wavelength signal $1214_{PASS}$ to form multiple wavelength signal $1214_{OUT}$ for communication through an optical communication system. In this particular embodiment, signals $1214_{DROP}$ and $1214_{ADD}$ each comprise one or more bands of multiple wavelength signals.

In the illustrated embodiment, tunable non-blocking OADM 1200 includes a control unit 1218 operable to apply one or more control voltages to non-blocking electro-optic tunable devices 1208a and 1208b. Although this example utilizes one control unit 1218, any number of additional control units could be used without departing from the scope of the present disclosure. In one particular embodiment, control unit 121B implements a feedback control circuit to monitor the add/drop channels from device 1200. The feedback control circuit may comprise any detection system capable of directly or indirectly measuring the capacitance of each non-blocking electro-optic tunable device 1208, such as, for example, an electrical error detection system.

In steady-state operation, first OADM module 1212a selectively removes one or more wavelength signals $1214_{DROP}$ from multiple wavelength signal $1214_{IN}$ and communicates multiple wavelength signal $1214_{PASS}$ from module 1212a. Second OADM module 1212b selectively combines one or more wavelength signals $1214_{ADD}$ to signal $1214_{PASS}$ and communicates multiple wavelength signal $1214_{OUT}$ from device 1200. In this particular embodiment, signals $1214_{DROP}$ and $1214_{ADD}$ comprise one or more bands of wavelength signals.

Before tuning OADM 1200 to add/drop a desired wavelength or wavelengths, the switch portion of each non-blocking electro-optic tunable device 1208a and 1208b is changed to a complementary state. The control voltage applied to each switch is modified to cause each switch to change from a matched state to a complementary state. While each switch is in a complementary state, first OADM module 1212a operates to communicate signal $1214_{IN}$ from module 1212a without removing any wavelength signals. In a similar manner, second OADM module 1212b operates to communicate signal $1214_{PASS}$ from module 1212b without combining any wavelength signals.

After each switch is changed from a matched state to a complementary state, the tunable OADM portion of each non-blocking electro-optic device 1208 is tuned to add/drop the desired wavelength or wavelengths. During tuning operations, the control voltage associated with the tunable OADM portion of each device 1208a and 1208b is then modified to add/drop the desired wavelength signals from device 1200. After each tunable OADM is tuned as desired, the voltage applied to each switch is adjusted to transfer each switch from the complementary state to a matched state.

4. Feedback Control for Non-Blocking Tunable Device

In various embodiments, the non-blocking tunable optical device implements a feedback control circuit to control and monitor the optical performance of the device. The feedback control circuitry operates to change the effective length of the optical cavity, which allows the device to communicate the desired wavelength or wavelengths from the device. Modifying the effective optical cavity length of the tunable device typically results in a change in capacitance of the device. Knowing the capacitance of the device enables the system operator to ascertain, indirectly, the wavelength signal or signals being transmitted through or reflected from the tunable optical device. In various embodiments, the feedback control circuitry can implement a feedback circuit capable of directly or indirectly measuring the capacitance of the non-blocking tunable device. In one particular embodiment, the feedback control circuit operates the tunable non-blocking device in a manner similar to a voltage variable capacitor.

FIG. 13 is a block diagram of one exemplary embodiment of an electro-optic voltage variable capacitor 1300. In this example, electro-optic voltage variable capacitor 1300 includes at least a pair of electrodes 1302 operable to receive a control signal 1304 from a feedback detection system. Electrodes 1302 are also operable to generate an electric field, based at least in part on control signal 1304, that selectively modifies the effective length of an optical cavity of a tunable, multiple cavity device.

In this example, voltage variable capacitor 1300 includes a multiple cavity device operable to selectively add/drop one or more wavelength signals. In various embodiments, the structure and function of the multiple cavity device can be substantially similar to any of the multiple cavity devices illustrated in FIGS. 1 through 6. In this particular embodiment, the multiple cavity device can be substantially similar to non-blocking electro-optic tunable device 1100 and/or 1150 of FIGS. 11A and 11b, respectively. Capacitor 1300 operates to generate a feedback signal 1306 based on the effective length of an optical cavity of the tunable multiple cavity device. In one particular embodiment, feedback signal 1306 comprises an electrical signal representing the capacitance of the tunable multiple cavity device. This aspect of the disclosure provides an advantage of reducing or eliminating a need for optical sensors, such as spectral analyzers to control the tunable optical device. Instead, this approach allows the use of simpler and less expensive electronic sensing and control circuitry.

Control signal 1304 may comprise, for example, an adjustment voltage or an error signal received from a feedback detection system. In some embodiments, the feedback system may comprise, for example, an analog or a digital feedback system.

FIG. 14 is a block diagram of one exemplary embodiment of a digital feedback control system 1400. In this example, system 1400 includes a voltage controlled oscillator 1450 operable to generate a feedback control signal 1406. In one particular embodiment, voltage controlled oscillator 1450 includes voltage controlled capacitor 1300 of FIG. 13.

System 1400 also includes a first counter 1456 coupled to oscillator 1450 and operable to generate a feedback count 1457. In this particular example, first counter 1456 operates to divide feedback signal 1414 by an amount determined by a digital signal 1455' representing a desired optical characteristic. System 1400 further includes a phase comparator 1460 operable to generate a control signal 1404, and a filter 1462 coupled between comparator 1460 and voltage controlled oscillator 1450. In this particular example, phase comparator 1460 operates to compare the phase of a reference count 1465 to the phase of feedback count 1457. Filter 1462 filters control signal 1404 to generate control signal 1304 of FIG. 13.

In this particular embodiment, system 1400 includes a set point module 1454 operable to determine the desired optical characteristic of one or more optical cavities coupled to system 1400. Set point module 1454 also operates to generate digital signal 1455 representing the desired optical characteristic.

System 1400 also includes a reference voltage controlled oscillator 1458 operable to generate an approximately constant reference frequency 1459. In this example, system 1400 includes a second counter 1464 coupled to reference oscillator 1458 and operable to generate reference count 1465 based at least in part on reference frequency 1459. The embodiment shown in FIG. 14 provides just one example of control circuitry that can be used in conjunction with a tunable optical device.

5. Surface Normal Modulator

FIG. 15 is a block diagram illustrating an exemplary embodiment of a surface normal modulator 1500. In an alternative embodiment, surface normal modulator 1500 can function as an optical switch. In this example, surface normal modulator 1500 includes a plurality of tunable filters 1502a-1502n each operable to receive a different wavelength signal 1508a-1508n. The plurality of tunable filters 1502 may comprise an array of tunable filters formed on a common substrate. Each tunable filter 1502 may comprise any device capable of providing a relatively high contrast ratio. In one particular embodiment, the relatively high contrast ratio of each tunable filter 1502 comprises at least five (5) decibels. In various embodiments, the relatively high contrast ration can comprise ten (10) decibels or more, twenty (20) decibels or more, or thirty (30) decibels of more.

In this embodiment, each tunable filter 1502 operates by shifting between a substantially transmissive state and a substantially reflective state. This change in operating state can be accomplished by changing a single-pass optical path or the effective cavity length of each tunable filter 1502. Good contrast ratios can be maintained even when the effective cavity length or the single-pass optical path of the tunable optical filter is changed by an amount that corresponds to a phase shift of less than $\pi/2$ for at least one wavelength.

In some embodiments, each tunable filter 1502 may comprise a tunable filter designed with its filter response centered on the particular wavelength signal 1508 received from optical light source 1504. Applying a control signal to each filter 1502 operates to shift the particular filter 1502 from transmitting the particular wavelength signal 1508 received to reflecting that wavelength signal 1508. In other embodiments, each tunable filter 1502 may comprise a tunable filter designed with its filter response not specifically centered on the particular wavelength signal 1508 received from optical light source 1504. Applying a specific control signal to each filter 1502 operates to shift the particular tunable filter 1502 from reflecting that particular wavelength signal 1508 to transmitting that wavelength signal 1508. In various embodiments, each filter 1502 comprises a substantially similar filter structure, designed to pass different wavelength signals upon application of substantially different control signals. In some embodiments, each filter 1502 comprises a substantially different filter structure, designed to pass different wavelengths upon application of a common control signal.

Each tunable filter 1502 can operate in transmission or reflection mode. That is, filter 1502 can operate to transmit selected wavelengths while reflecting others, or can operate to reflect selected wavelengths while transmitting others. For ease of description, the following discussion assumes that filter 1502 operates in transmission mode, transmitting a selected wavelength or range of wavelengths, while reflecting others.

In one particular embodiment, each tunable filter 1502 generates a square-like or flat-top filter response, which provides a contrast ratio of at least five (5) decibels. In various embodiments, the square-like response can comprise a −1 decibel bandwidth of at least 12.5 giga-Hertz, 20 giga-Hertz, 25 giga-Hertz or more. In other embodiments, the square-like response can comprise a −30 decibel bandwidth of at least 500 giga-Hertz, 250 giga-Hertz, 100 giga-Hertz or less.

One aspect of this disclosure recognizes that a tunable filter comprising a square-like filter response and a contrast ratio of at least five (5) decibels enables the tunable filter to be used as a digital modulator or encoder. That is, the square-like filter function of each tunable filter 1502 allows each wavelength signal 1508 received by its respective filter 1502 to be selectively reflected or transmitted, as desired, by introducing a relatively small change in the effective cavity length of filter 1502. For example, where a filter response is initially capable of transmitting the 1550 nm wavelength, changing the effective cavity length of the filter shifts the filter response and enable filter 1502 to reflect the 1550 nm wavelength. In some embodiments, the change in effective cavity length or single-pass optical path of the optical cavity can correspond to a phase shift of less than $\pi/2$, for at least one wavelength. In other embodiments, the change in effective cavity length or single-pass optical path of the opt-cal cavity can correspond to a phase shift of $\pi/4$ or less, or $\pi/100$ or less.

In one particular embodiment, each tunable filter 1502 may comprise a tunable multiple cavity device capable of generating a square-like response. In one example, the structure and function of each tunable filter 1502 can be substantially similar to multiple cavity device 100 of FIG. 1. In this example, the speed of each filter depends at least in part on the response time of the electro-optic material used to form the optical cavity of tunable filter 1502 and on the capacitance of each filter 1502. The electro-optic material may comprise any material capable of supporting a relatively rapid modulation rate, such as, for example, lithium niobate or lithium tantalate. In some embodiments, each tunable filter 1502 is capable of tuning/modulating at a rate of 9.5 gigabits per second or more. In addition, it is advantageous to maintain a relatively low capacitance of each filter 1502 to generate a time constant that is as short as possible, for example, one hundred (100) picoseconds or less.

In this particular embodiment, surface normal modulator 1500 receives a plurality of different wavelength signals 1508a–1508n from an optical light source 1504. Optical light source 1504 may comprise any light source or combination of sources capable of generating a plurality of different wavelengths of light. For example, light source 1504 may comprise a plurality of laser diodes, a plurality of light emitting diodes, or a broadband light source with an array of optical filters to form individual wavelength signals. In one particular embodiment, optical light source 1504 comprises an array of laser diodes. Forming optical light source 1504 into an array is advantageous in reducing the cost and size of optical light source 1504. In other embodiments, optical light source 1504 can be co-located with surface normal modulator 1500 on a common substrate.

In this particular embodiment, surface normal modulator 1500 operates to modulate information onto wavelength signals 1508 by changing the effective cavity length of each of the plurality of tunable filters 1502. In this example, each tunable filter 1502 receives a control signal from a data controller 1506. The control signal operates to change the effective cavity length of each filter 1502, which, in turn, modulates information onto wavelength signals 1508. The control signals generated by controller 1506 may comprise any signals capable of changing the effective cavity length of each tunable filter 1502, such as, for example, one or more electrical signals. In one particular embodiment, controller 1506 and surface normal modulator 150C may be co-located on the same substrate.

In one particular embodiment, data controller 1506 modulates a digital signal onto each of the plurality of wavelength signals 1508. For example, when controller 1506 generates a control signal to change the operating state of tunable filter 1502a from a reflecting state to a transmitting state, wavelength signal 1508a is transmitted through filter 1502a, thus generating a "1". When controller 1506 generates a control signal to change the operating state of filter 1502a from transmitting state to reflecting state, wavelength signal 1508a is reflected, thus generating a "0".

Although the present invention has been described in several embodiments, a myriad of changes, variations, alterations, transformations, and modifications may be suggested to one skilled in the art, and it is intended that the present invention encompass such changes, variations, alterations, transformation, and modifications, as falling within the spirit and scope of the appended claims.

What is claimed is:

1. A tunable optical device comprising:
   thin film device comprising a plurality of cavities each comprising an electro-optic material, the electro-optic material comprising an optical characteristic capable of being manipulated by application of an electric field;
   wherein at least some of the plurality of cavities are physically coupled to others of the plurality of cavities; and
   wherein the plurality of cavities comprise a sufficient number of cavities to result in an approximately square frequency response for the device, the approximately square frequency response comprising a frequency response with a −1 decibel bandwidth of no less than 20 GHZ.

2. The tunable optical device of claim 1, wherein the tunable optical device comprises a band optical add/drop multiplexer.

3. The tunable optical device of claim 2, wherein the band optical add/drop multiplexer comprises a serial combination of thin film devices.

4. The tunable optical device of claim 1, wherein the thin film device comprises a plurality of Fabry-Perot structures.

5. The tunable optical device of claim 4, wherein each of the Fabry-Perot structures comprises a substantially similar structure.

6. The tunable optical device of claim 1, wherein the electro-optic material completely fills at least one of the plurality of cavities.

7. The tunable optical device of claim 1, wherein the thin film device comprises a device selected from the group consisting of a switch, a filter, an optical add/drop multiplexer, and a modulator.

8. The tunable optical device of claim 1, wherein each optical cavity comprises a substantially similar electro-optic material.

9. The tunable optical device of claim 1, wherein at least two of the plurality of cavities contain different electro-optic materials.

10. The tunable optical device of claim 1, wherein the electro-optic material comprises a material selected from a group consisting of Lithium Niobate, Lithium Tantalate, Strontium Barium Niobate, and Lanthanum modified Lead Zirconate Titanate.

11. The tunable optical device of claim 1, wherein the electro-optic material comprises a liquid crystal material.

12. The tunable optical device of claim 1, wherein the electro-optic material comprises a substantially uniaxial crystalline material.

13. The tunable optical device of claim 1, wherein the electro-optic material comprises a crystal axis that is substantially parallel to the electric field applied to the thin film device.

14. The tunable optical device of claim 1, wherein the optical characteristic comprises an index of refraction of the electro-optic material.

15. The tunable optical device of claim 1, wherein the optical characteristic comprises a polarization property of the electro-optic material.

16. The tunable optical device of claim 1, wherein at least a portion of a multiple wavelength optical signal incident on the thin film device is transmitted through each of the plurality of cavities and wherein at least a portion of the optical signal is reflected from the thin film device, the determination of the transmitted and reflected signal portions being based at least in part on the electric field applied to the electro-optic material residing in each cavity.

17. The tunable optical device of claim 16, wherein the at least a portion of a multiple wavelength optical signal transmitted through each of the plurality of optical cavities comprises one or more optical signal wavelengths.

18. The tunable optical device of claim 16, wherein the at least a portion of the multiple wavelength signal reflected from the thin film device comprises one or more optical signal wavelengths.

19. The tunable optical device of claim 16, wherein the electric field is applied substantially parallel to a direction of propagation of the multiple wavelength optical signal received by the thin film device.

20. The tunable optical device of claim 16, wherein the electric field is applied substantially perpendicular to a direction of propagation of the multiple wavelength optical signal received by the thin film device.

21. The tunable optical device of claim 16, wherein the electric field is applied substantially perpendicular to a polarization axis of at least one of a pair of approximately orthogonally polarized beam components.

22. The tunable optical device of claim 1, wherein the plurality of cavities comprises at least three (3) cavities collectively capable of producing the approximately square frequency response.

23. The tunable optical device of claim 1, wherein the plurality of cavities comprises at least five (5) cavities collectively capable of producing the approximately square frequency response.

24. The tunable optical device of claim 1, wherein the approximately square frequency response comprises a frequency response with a −1 decibel bandwidth of no less than 25 GHZ.

25. The tunable optical device of claim 1, wherein the approximately square frequency response comprises a frequency response with a −30 decibel bandwidth of no more than 500 GHZ.

26. The tunable optical device of claim 1, wherein the approximately square frequency response comprises a frequency response with a −30 decibel bandwidth of no more than 250 GHZ.

27. The tunable optical device of claim 1, wherein the approximately square frequency response comprises a frequency response with a −30 decibel bandwidth of no more than 200 GHZ.

28. The tunable optical device of claim 27, wherein the plurality of electrodes comprises a separate pair of electrodes for each of the plurality of optical cavities.

29. The tunable optical device of claim 1, further comprising a plurality of electrodes operable to create the electric field applied to the thin film device.

30. The tunable optical device of claim 29, wherein the plurality of electrodes comprises at least two (2) electrodes.

31. The tunable optical device of claim 1, further comprising a polarization diversity assembly operable to form a substantially polarization independent thin film device.

32. A tunable optical device comprising:
a thin film device comprising at least one cavity comprising an electro-optic material, the electro-optic material comprising an optical characteristic capable of being manipulated by application of an electric field;
wherein at least a portion of a multiple wavelength optical signal incident on the thin film device is transmitted through the at least one cavity and wherein at least a portion of the optical signal is reflected from the thin film device, the determination of the transmitted and reflected signal portions based at least in part on the electric field applied to the electro-optic material residing in each cavity; and
wherein the thin film device substantially achieves polarization independence and substantially achieves a polarization dependent loss of two (2) decibels or less for at least one wavelength of the multiple wavelength optical signal.

33. The tunable optical device of claim 32, wherein the at least one cavity comprises three (3) or more cavities.

34. The tunable optical device of claim 32, wherein the electro-optic material comprises a liquid crystal material.

35. The tunable optical device of claim 32, wherein the optical characteristic comprises an index of refraction of the electro-optic material.

36. The tunable optical device of claim 32, wherein the electric field is applied substantially parallel to a direction of propagation of the multiple wavelength optical signal received by the thin film device.

37. The tunable optical device of claim 32, wherein the electro-optic material comprises a substantially uniaxial crystalline material.

38. The tunable optical device of claim 32, wherein the electro-optic material comprises a crystal axis that is substantially parallel to the electric field applied to the thin film device.

39. The tunable optical device of claim 32, wherein the thin film device substantially achieves a polarization dependent loss of one (1) decibel or less for at least one wavelength of the multiple wavelength optical signal.

40. The tunable optical device of claim 32, wherein the thin film device substantially achieves a polarization dependent loss of one-half (½) decibel or less for at least one wavelength of the multiple wavelength optical signal.

41. The tunable optical device of claim 32, further comprising a polarization diversity assembly operable to form a substantially polarization independent thin film device.

42. The tunable optical device of claim 32, wherein the polarization diversity assembly comprises:
- a first polarization beam splitter operable to spatially separate the multiple wavelength optical signal into two approximately orthogonally polarized beam components; and
- a plurality of transversely configured thin film devices each operable to receive one of the approximately orthogonally polarized beam components,
- wherein the electric field is applied independently to each of the plurality of transversely configured thin film devices; and wherein each electric field is applied substantially parallel to a polarization axis of the approximately orthogonally polarized beam component received by each of the plurality of transversely configured thin film devices.

43. A tunable optical device comprising:
- a thin film device comprising at least one cavity comprising an electro-optic material, the electro-optic material comprising an optical characteristic capable of being manipulated by application of an electric field;
- wherein at least a portion of a multiple wavelength optical signal incident on the thin film device is transmitted through the at least one cavity and wherein at least a portion of the optical signal is reflected from the thin film device, the determination of the transmitted and reflected signal portions based at least in part on the electric field applied to the electro-optic material residing in each cavity; and
- wherein a ripple penalty associated with the at least a portion of the multiple wavelength signal that travels through the at least one optical cavity comprises approximately one (1) decibel or less.

44. The tunable optical device of claim 43, wherein the at least one cavity comprises three (3) or more cavities.

45. The tunable optical device of claim 43, wherein the electro-optic material comprises a material selected from a group consisting of Lithium Niobate, Lithium Tantalate, Strontium Barium Niobate, and Lanthanum modified Lead Zirconate Titanate.

46. The tunable optical device of claim 43, wherein the electro-optic material comprises a liquid crystal material.

47. The tunable optical device of claim 43, further comprising:
- a plurality of electrodes operable to create the electric field applied to the thin film device; and
- at least one ripple layer operable to substantially control the ripple penalty associated with the at least a portion of the multiple wavelength signal that travels through the at least one optical cavity.

48. A method of selectively communicating an optical signal from a tunable optical device, comprising:
- receiving a multiple wavelength signal at a thin film device comprising a plurality of cavities each comprising an electro-optic material;
- manipulating an optical characteristic associated with the electro-optic material by application of an electric field to the thin film device; and
- selectively communicating one or more wavelengths of the multiple wavelength signal based at least in part on the applied electric field;
- wherein at least some of the plurality of cavities are physically coupled to others of the plurality of cavities; and
- wherein the plurality of cavities comprises a sufficient number of cavities to result in an approximately square frequency response for the device, the approximately square frequency response comprising a frequency response with a −1 decibel bandwidth of no less than 20 GHZ.

49. The method of communicating of claim 48, wherein the electro-optic material completely fills at least one of the plurality of cavities.

50. The method of communicating of claim 48, wherein each optical cavity comprises a substantially similar electro-optic material.

51. The method of communicating of claim 48, wherein the electro-optic material comprises a crystal axis that is substantially parallel to the electric field applied to the thin film device.

52. The method of communicating of claim 48, wherein manipulating the optical characteristic comprises changing a polarization property of the electro-optic material.

53. The method of communicating of claim 48, wherein selectively passing one or more wavelengths of the multiple wavelength signal comprises changing the electric field applied to the thin film device.

54. The method of communicating of claim 48, wherein the electric field applied to the thin film device creates an effective tuning range of the electro-optic material no less than ten (10) nanometers.

55. The method of communicating of claim 48, wherein the electric field is applied substantially parallel to a direction of propagation of the multiple wavelength optical signal received by the thin film device.

56. The method of communicating of claim 48, wherein the electric field is applied substantially perpendicular to a direction of propagation of the multiple wavelength optical signal received by the thin film device.

57. The method of communicating of claim 48, wherein the plurality of cavities comprises at least three (3) cavities collectively capable of producing the approximately square frequency response.

58. The method of communicating of claim 57, wherein each of the cavities comprises a substantially similar cavity length.

59. The method of communicating of claim 57, wherein the electric field is applied to each cavity individually to achieve a substantially similar effective cavity length.

60. The method of communicating of claim 48, wherein the approximately square frequency response comprises a frequency response with a −30 decibel bandwidth of no more than 500 GHZ.

61. A tunable optical device comprising:
- a thin film device comprising at least three (3) cavities, each cavity comprising an electro-optic material, the electro-optic material comprising an optical characteristic capable of being manipulated by application of an electric field;
- wherein at least a portion of a multiple wavelength optical signal incident on the thin film device is transmitted through the at least three (3) cavities and wherein at least a portion of the optical signal is reflected from the thin film device, the determination of the transmitted and reflected signal portions based at least in part on the electric field applied to the electro-optic material residing in each cavity; and
- wherein the thin film device substantially achieves polarization independence and wherein the thin film device substantially achieves a polarization dependent loss of two (2) decibels or less for at least one wavelength of the multiple wavelength optical signal.

62. A tunable optical device comprising:

a thin film device comprising at least one cavity comprising a liquid crystal material, the liquid crystal material comprising an optical characteristic capable of being manipulated by application of an electric field;

wherein at least a portion of a multiple wavelength optical signal incident on the thin film device is transmitted through the at least one cavity and wherein at least a portion of the optical signal is reflected from the thin film device, the determination of the transmitted and reflected signal portions based at least in part on the electric field applied to the liquid crystal material residing in each cavity; and wherein the thin film device substantially achieves polarization independence and wherein the thin film device substantially achieves a polarization dependent loss of two (2) decibels or less for at least one wavelength of the multiple wavelength optical signal.

63. A tunable optical device comprising:

a thin film device comprising at least one cavity comprising an electro-optic material, the electro-optic material comprising an optical characteristic capable of being manipulated by application of an electric field, wherein the electro-optic material comprises a crystal axis that is substantially parallel to the electric field applied to the thin film device;

wherein at least a portion of a multiple wavelength optical signal incident on the thin film device is transmitted through the at least one cavity and wherein at least a portion of the optical signal is reflected from the thin film device, the determination of the transmitted and reflected signal portions based at least in part on the electric field applied to the electro-optic material residing in each cavity; and wherein the thin film device substantially achieves polarization independence and wherein the thin film device substantially achieves a polarization dependent loss of two (2) decibels or less for at least one wavelength of the multiple wavelength optical signal.

64. A tunable optical device comprising:

a thin film device comprising at least three (3) cavities, each cavity comprising an electro-optic material, the electro-optic material comprising an optical characteristic capable of being manipulated by application of an electric field;

wherein at least a portion of a multiple wavelength optical signal incident on the thin film device is transmitted through the at least three (3) cavities and wherein at least a portion of the optical signal is reflected from the thin film device, the determination of the transmitted and reflected signal portions based at least in part on the electric field applied to the electro-optic material residing in each cavity; and wherein the thin film device reduces a ripple penalty associated with the at least a portion of the multiple wavelength signal that travels through the at least three (3) optical cavities, the ripple penalty associated with the at least a portion of the multiple wavelength signal comprising approximately three (3) decibels or less.

65. The tunable optical device of claim 64, wherein the ripple penalty associated with the at least a portion of the multiple wavelength signal comprises approximately two (2) decibels or less.

* * * * *